US012669236B2

(12) United States Patent
Dixon et al.

(10) Patent No.: US 12,669,236 B2
(45) Date of Patent: Jun. 30, 2026

(54) ANNULAR CLAMP DEVICE

(71) Applicant: AURA Technologies, LLC, Chapel Hill, NC (US)

(72) Inventors: Mark Dixon, Morrisville, NC (US); Garrett Goss, Cary, NC (US); Alex Blate, Chapel Hill, NC (US); Douglas Bennett, Chapel Hill, NC (US); Anna Bennett, Chapel Hill, NC (US)

(*) Notice: Subject to any disclaimer, the term of this patent is extended or adjusted under 35 U.S.C. 154(b) by 0 days.

(21) Appl. No.: 18/916,211

(22) Filed: Oct. 15, 2024

(65) Prior Publication Data

US 2026/0016143 A1 Jan. 15, 2026

Related U.S. Application Data

(60) Provisional application No. 63/543,890, filed on Oct. 12, 2023.

(51) Int. Cl.
*F21V 19/00* (2006.01)
*F21Y 115/10* (2016.01)

(52) U.S. Cl.
CPC .......... *F21V 19/003* (2013.01); *F21V 19/004* (2013.01); *F21Y 2115/10* (2016.08)

(58) Field of Classification Search
CPC .. F21V 19/003; F21V 19/004; F21V 19/0045; F21V 19/005
See application file for complete search history.

(56) References Cited

U.S. PATENT DOCUMENTS 7,710,737 B2 5/2010 Lynch et al.
8,760,878 B2 6/2014 Lostoski et al.
10,314,160 B2 6/2019 Suzuki et al.
2008/0273327 A1* 11/2008 Wilcox .................. F21V 5/007 362/311.06
2013/0223021 A1 8/2013 Holman et al.
2014/0268763 A1* 9/2014 Duckworth ............ F21V 15/01 362/244
2020/0041115 A1* 2/2020 Kim ...................... F21V 19/003
2022/0060833 A1* 2/2022 Gunn ..................... H04R 1/028
(Continued)

FOREIGN PATENT DOCUMENTS

CN 209406634 U 9/2019
CN 212436128 U 1/2021
CN 212573302 U 2/2021
(Continued)

OTHER PUBLICATIONS

Machine translation of Louis, DE-202010013958-U1, published Dec. 2, 2010 (Year: 2010).*
(Continued)

*Primary Examiner* — William N Harris
(74) *Attorney, Agent, or Firm* — Danielson Legal LLC

(57) ABSTRACT

An apparatus including: a first clamp plate having an inner diameter defining an aperture, a first outer diameter, and a first thickness; a second clamp plate having: a second outer diameter, and a second thickness. The bottom clamp plate and the top clamp plate are configured to clamp a printed circuit board by penetrating the printed circuit board, the printed circuit board including at least one component positioned within the aperture during clamping of the printed circuit board by the first clamp plate and the second clamp plate.

18 Claims, 14 Drawing Sheets

(56) References Cited

U.S. PATENT DOCUMENTS

| | | | | | |
|---|---|---|---|---|---|
| 2022/0299197 | A1 * | 9/2022 | Henrici | .............. | G02B 19/0028 |

FOREIGN PATENT DOCUMENTS

| | | | | | |
|---|---|---|---|---|---|
| CN | 216291881 | U | 4/2022 | | |
| CN | 114531816 | A | 5/2022 | | |
| CN | 219322654 | U | 7/2023 | | |
| CN | 219812296 | U | 10/2023 | | |
| CN | 220023390 | A | 11/2023 | | |
| DE | 202010013958 | U1 * | 12/2010 | ............... | F21K 9/00 |
| EP | 2931011 | Y | 10/2015 | | |
| EP | 4060223 | A1 * | 9/2022 | ................ | F21S 8/03 |
| JP | 3911995 | B2 | 5/2007 | | |

OTHER PUBLICATIONS

Machine translation of Henrici et al., EP-4060223-A1, published Sep. 21, 2022 (Year: 2022).*

* cited by examiner

ANNULAR CLAMP DEVICE

CROSS REFERENCE TO RELATED APPLICATIONS

The present application claims the benefit of and priority to U.S. provisional application No. 63/543,890, filed on Oct. 12, 2023, the content of which is hereby incorporated by reference as if set forth in its entirety herein.

STATEMENT REGARDING FEDERALLY SPONSORED RESEARCH OR DEVELOPMENT

This/these invention(s) were made with Government support under contract W911NF-21-F-0017 awarded by the United States Army. The Government may have certain rights in the invention(s).

TECHNICAL FIELD

Embodiments described herein generally relate to lighting modules and, more particularly but not exclusively, to lighting modules and techniques for supporting lighting modules.

BACKGROUND

Existing lighting modules may include a thermally-conductive substrate on the bottom of a flexible printed circuit (FPC). The FPC may be further below a lighting element such as a light emitting diode (LED). The substrate plate is intended to prevent flexure of the lighting module proximate to the LED, thereby protecting the LED and its solder joints. The substrate plate also directs heat away from certain components, thereby improving thermal performance. However, the LED and other components may remain exposed to mechanical or environmental damage.

A need exists, therefore, for improved lighting modules and associated components thereof.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to an apparatus comprising a first clamp plate having an inner diameter defining an aperture, a first outer diameter, and a first thickness; a second clamp plate having a second outer diameter and a second thickness; wherein the bottom clamp plate and the top clamp plate are configured to clamp a printed circuit board by penetrating the printed circuit board, the printed circuit board including at least one component positioned within the aperture during clamping of the printed circuit board by the first clamp plate and the second clamp plate.

In some embodiments, the printed circuit board is a flexible printed circuit.

In some embodiments, the second clamp plate includes at least one feature that extends through the printed circuit board and mechanically attaches to the first annular clamp. In some embodiments, the second clamp plate extends beyond a top surface of the first clamp plate and a mechanical connection between the first clamp plate and the second clamp plate is effectuated by bending, peining, pressing, soldering, welding, brazing, or heat staking of the feature of the second clamp plate.

In some embodiments, the first clamp plate and the second clamp plate are each configured to accept a fastener that passes through at least a portion of the first clamp plate, the printed circuit board, and at least a portion of the second clamp plate.

In some embodiments, a thermal paste or compound is installed at an interface between the printed circuit board and at least one of the first clamp plate or the second clamp plate.

In some embodiments, one or both of the first clamp plate and the second clamp plate comprises a polymer or plastic.

In some embodiments, the second clamp plate includes a relief or cut-out providing clearance for a substrate plate.

In some embodiments, a substrate plate is installed on a bottom side of the printed circuit board under the at least one component. In some embodiments, the substrate plate is integrated into the second clamp plate.

In some embodiments, the first clamp plate is a low-thermal-resistance annular plate configured to mechanically connect with the second clamp plate.

According to another aspect, embodiments relate to an apparatus comprising a first annular clamp including an inner diameter, an outer diameter, and a thickness; a printed circuit board in operable connectivity with the first annular clamp including one or more copper layers and one or more substrate layers; and at least one component configured to be installed on the printed circuit board at a position such that the inner diameter subtends the at least one component.

In some embodiments, the first annular clamp plate is configured to reduce thermal resistance between or among the at least one component, the at least one printed circuit board, and the ambient environment.

In some embodiments, the first annular clamp plate is configured to provide mechanical support for the at least one component.

In some embodiments, the first annular clamp plate is configured to provide mechanical support for a point of attachment between the at least one component and the printed circuit board.

In some embodiments, the printed circuit board is a flexible printed circuit board.

In some embodiments, the thickness of the first annular clamp plate is greater than or equal to a height of the component on the printed circuit board.

In some embodiments, the first annular clamp plate is attached to the printed circuit board at least in part by means of solder or an adhesive, or a thermally-conductive adhesive.

In some embodiments, the apparatus further includes a substrate plate installed on a side of the printed circuit board opposite the component

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
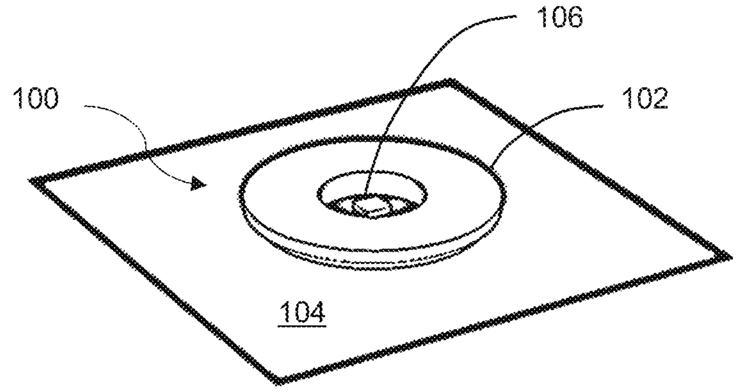
FIG. 1 illustrates an annular plate in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

"Semi-flexible" lighting modules can be non-destructively and repeatedly bent along at least one axis up to some minimum radius of curvature. As a non-normative analogy, a thick rubber doormat is semi-flexible, whereas a bedsheet is "flexible." Semi-flexible lighting modules (for simplicity, "SFLMs") may be useful in applications in which it is desirable or necessary for a lighting module to conform to a non-flat surface. As another example, SFLMs may be (semi)-permanently attached to structures such as tents, and without interfering with folding or rolling of the structure for storage or transportation. It is understood that apparatus and methods, or aspects thereof, relating to SFLMs may be applicable to rigid lighting modules or other applications and that the adjectives "flexible" or "semi-flexible" are non-limiting.

The present application discloses various classes of improvements to SFLMs. One class of improvement comprises novel apparatuses and methods for providing thermal management, mechanical support, and protection to SFLMs. These apparatuses may be referred to herein, without limitation, as plates, annular plates, clamps, annular clamps, clamp plates, or the like. In the context of the present application, the term "annular" may describe annular clamps having forms other than annuli. In some embodiments, the outer geometries of the top and bottom plates may be distinct (e.g., a round top plate and an oval bottom plate).

Another class of improvement comprises novel apparatuses and methods for the protection of SFLM panels. These may include panels comprising electronics and may be referred to as "superstructures" herein. The superstructure is designed to support the flexible circuit, limit the bend radius of the circuit to a radius that does not compromise its function or result in damage, and to not be an impediment to thermal management.

A clamp in accordance with the embodiments herein comprises two pieces (i.e., clamp plates) that are positioned on opposite sides of a flexible circuit. These positions eliminate the ability for the area near the flexible circuit to bend and prevent solder joint damage and other damage. The clamp assembly may further function as a heat sink or heat spreader.

The clamp plate on the top side of the circuit may protect a light emitting diode (LED) from mechanical damage because, in some embodiments, its thickness is more than the height of the LED. The clamp plate on the top side of the circuit may protect components other than LEDs or critical regions of the circuit board. This top clamp plate may also function as a container for an encapsulant that may offer further mechanical protection and reduce glare by effectively increasing the source size of the LED or provide other optical functions. The top clamp plate may also function as a form or mold for liquid encapsulants. Encapsulants may also protect the LED from environmental factors such as electrostatic discharge, moisture, and contaminants such as solvents. Encapsulants may also provide aesthetic characteristics.

The annular clamp and/or the superstructure may be integrated in a system by which the flexibility of a circuit may be limited in some areas and eliminated in other areas. Accordingly, the features of the disclosed embodiments reduce the likelihood of damage to the LED and/or the flexible printed circuit (FPC).

In some embodiments, the top clamp plate may retain one or more optical elements such as lenses, diffusers, or filters.

In some embodiments, the bottom clamp plate may include or otherwise be configured with one or more integrated fasteners that are accepted by the top clamp.

In some embodiments the top clamp plate may include or otherwise be configured with one or more integrated fasteners that are accepted by the bottom clamp plate. This feature may reduce assembly time, reduce bill-of-material (BOM) count, or reduce part cost. In some embodiments, the geometric arrangement of integrated fasteners; components that accept integrated or non-integrated fasteners; components that induce chirality, keying, or similar techniques or mechanisms may be used to ensure specific location or alignment between or among the top and bottom clamp plates and possibly other structures through which such fasteners may pass or with which such fasteners may otherwise interact or as interfaces with tooling, for example, for alignment or support during installation or fastening. Some embodiments may comprise specific features, such as fasteners, with one or both of the top and bottom clamp plates.

Although the present application discusses that the light emitters may be LEDs and that the noun "LED" is used herein for expository purposes, features of the disclosed embodiments are applicable to other types of light emitters or other optical, electro-optical, or electronic devices. In like manner, the principles and technologies of SFLMs may be used in embodiments in non-lighting applications such as sensor modules or arrays, antennae or antenna arrays, or power or communications components. Additionally, the features of the described embodiments may be applicable to embodiments at scales smaller or larger than a typical SFLM. These may include wearable electronic devices, automotive components, aviation or aerospace components, medical devices, maritime components, athletic equipment, or the like.

The descriptions of items or embodiments as being used in the context of FPCs are non-limiting and that some such items or embodiments may be applicable to other circuit technologies, such as flat-flex cables (FFCs), printed circuit boards (PCBs), etc. The terms "board" and "circuit board" refer to a general equivalence class of electronic assemblies and not necessarily to specific embodiments thereof.

FIG. 1 illustrates an annular plate 100 in accordance with one embodiment. As seen in FIG. 1, a top clamp plate 102 is operably positioned with respect to a circuit board 104. Specifically, the top clamp plate 102 provides a clamping force on the circuit board 104 with a bottom clamp plate, not shown in FIG. 1. Also shown is a light emitter 106 centered in the top clamp plate 102.

In some embodiments, the annular plate 100 is constructed from a thermally-conductive material such as, without limitation, aluminum, copper, or THERMALLOY®. These materials are metals and may be "rigid", particularly in comparison to an FPC. The degree of rigidity or non-rigidity of such annular plates will depend on numerous factors such as thickness, the specific metal(s) or alloy(s), heat treatment parameters, geometric features, etc. Some such factors may also influence thermal resistance.

Certain embodiments described or depicted herein may comprise metals having thicknesses of around one or two millimeters. Other materials such as thermally-enhanced (i) plastics, (ii) polymers, (iii) thermoplastic materials, or (iv) thermoset materials or other materials may be used in conjunction with or in the place of metals.

The annular plate 100 may be attached to an FPC or equivalent in a variety of ways. These may include, but are not limited to, soldering, adhesives, elastomeric adhesives, thermally-conductive adhesives, fasteners, heat-staking, peining, etc.

In some embodiments, at least a portion of the contact surface between a clamp plate and the FPC may be coated or treated with a thermal compound or equivalent to reduce thermal resistance. Some embodiments may comprise both an adhesive and a thermal compound applied to such contact surface. In some embodiments, an annular plate may be retained to an FPC, at least in part, by one or more of an encapsulant, coating, over-molding, mechanical fastener(s), or by the superstructure described herein.

The embodiments comprising non-annular geometries with eccentric placement of a hole, with multiple holes, or of non-circular shapes are functionally equivalent in the methods and apparatuses taught herein. Accordingly, the adjective "annular" is non-limiting.

In one aspect, the annular plate 100 functions as a heat spreader. In another aspect, an annular plate of sufficient thickness provides protection to the lighting element from classes of mechanical insults or contact, such as from compression or shear forces. In another aspect, the annular plate prevents flexure of the FPC over the region subtended by the annular plate and, in particular, around or through the lighting element or its solder joints and the edges of the outer perimeter of an annular plate may be radiused or chamfered to prevent damage to the FPC during flexure.

In some embodiments, a transparent or translucent cover or layer over the light emitter may provide further protection against mechanical damage, environmental damage, or both. This cover may comprise one or more optical elements to focus the light output by the emitter in accord with certain specifications. In some embodiments, the cover is incorporated into or attached to the annular plate, such as by an adhesive, clips, pinning, threads, or other interlocking mechanisms.

In some embodiments, the cover is removable and exchangeable for an alternative cover to, for example, select a wider-beam lens, to add a filter, to add a diffuser, or to replace a damaged cover. In some embodiments, the mechanical attachment or coupling between an annular plate and a cover includes a gasket, sealant, or other mechanism to provide a waterproof or water-resistant union. In some embodiments, this seal is replaceable.

In some embodiments, the cover comprises a clear or translucent compound or encapsulant and, in such embodiments, the annular plate may function as a mold or form for the installation of such covers in situ after installation of the annular plate. The cover, independent of form, may be thermally-conductive.

Figure 2:
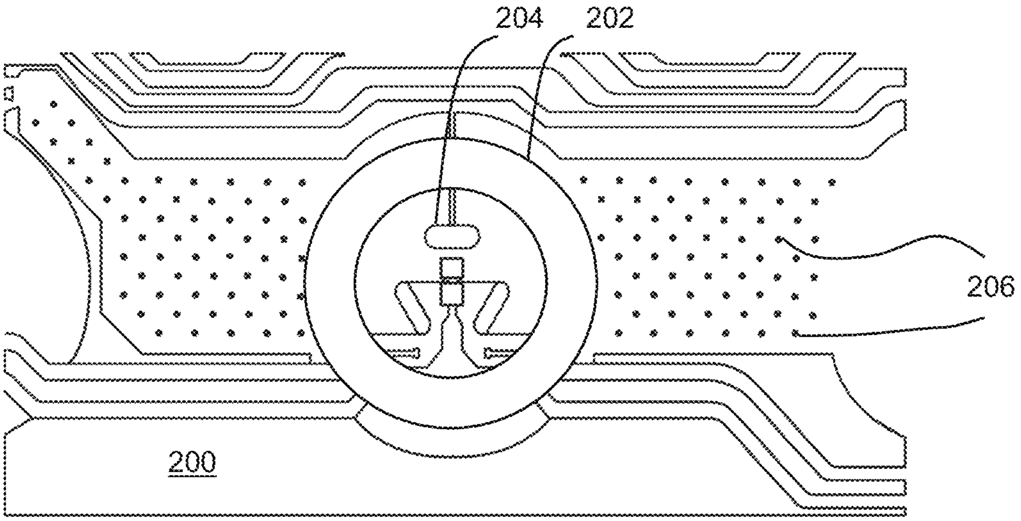
FIG. 2 illustrates a top view of a flexible circuit board (FCB) with an annular plate in accordance with one embodiment.

FIG. 2 illustrates a top view of an FPC 200 with an annular plate 202 in accordance with one embodiment. The annular plate 202 has an inner diameter and an outer diameter, wherein a light emitter 204 is positioned within the inner diameter. In this embodiment, the FPC 200 may be designed such that copper pours or traces 206 lay on a plane below the annular plate 202. These traces 206 may be close to a heat source, such as a thermal pad of a surface-mounted part. In some embodiments, solder mask is not applied the surface of the FPC 200 that is in contact with the annular plate 202 to provide lower thermal resistance.

The traces 206 may comprise small voids (i.e., areas of the copper layer that are etched away during manufacturing). The voids may be arranged in a pattern such as, without limitation, a rectilinear or polygonal grid, a "polka dot" pattern, etc. These patterned areas serve multiple functions. In some embodiments, the voids of the pattern may improve the flexibility of the FPC 200 in the patterned areas. In some embodiments, the voids in the pattern may act to limit the extent of tears in the FPC 200 in a manner not dissimilar to the principles behind rip-stop fabrics. The removal of a small percentage of the copper in the patterned areas has an insignificant impact on the thermal resistance of the respective copper pour. In some embodiments, the voids may comprise "vias", sometimes known as thermal vias, which are plated through-holes that electrically and thermally couple traces 206 to traces or pours on the reverse side of the FPC 200 (not shown).

Figure 3:
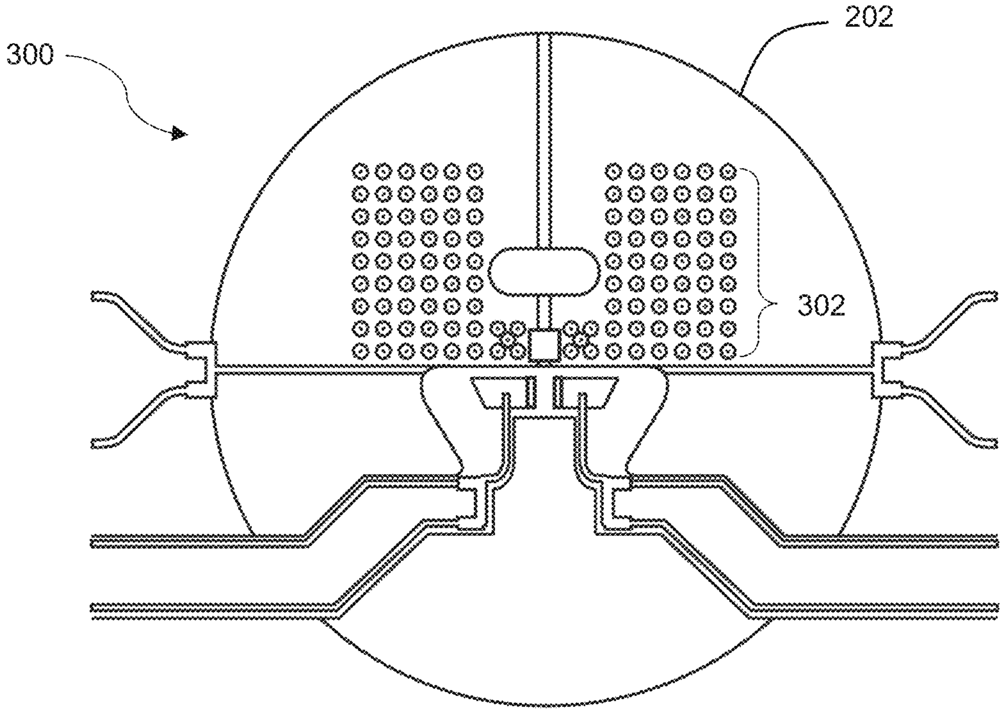
FIG. 3 illustrates a detailed view of an area proximate to the plate of FIG. 2 in accordance with one embodiment.

FIG. 3 illustrates a detailed view 300 of the area proximate to the plate 202 of FIG. 2 in accordance with one embodiment. Specifically, FIG. 3 illustrates thermal vias 302 connecting layers of copper for thermal coupling. In some embodiments, thermal vias may be arranged to thermally couple with an annular plate or a substrate plate. In some embodiments, vias not covered by solder mask may be used to reduce thermal resistance between plates or to conduct heat from a heat source component on one side of the FPC to a thermal sink or spreader, such as a plate, on the reverse side of the FPC. Vias, which conduct electricity, electrically bond conductors on opposite sides of the board and may be used to increase current-carrying capacity, reduce resistance, reduce inductance, or to control radiated electromagnetic emissions.

Figure 4:
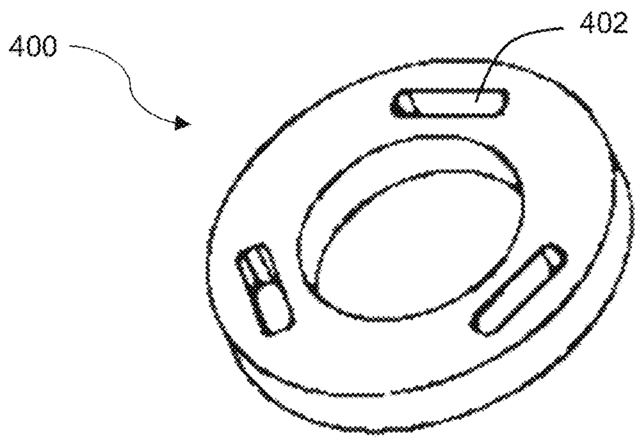
FIG. 4 illustrates a top clamp plate in accordance with one embodiment.

FIG. 4 illustrates a top clamp plate 400 in accordance with one embodiment. The top clamp plate 400 may be similar to the plate 102 of FIG. 1, for example. The top clamp plate 400 may further include one or more slots 402 or otherwise holes or apertures through the plate. In some embodiments, these slots 402 may receive a tab, pin, or other type of structure that mechanically couples the top clamp plate 400 to the bottom plate.

Figure 5A:
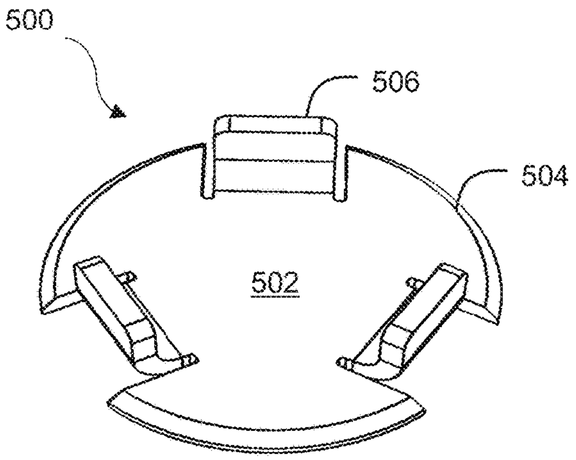
FIGS. 5A and 5B illustrate perspective and top views, respectively, of a bottom clamp plate in accordance with one embodiment.
Figure 5B:
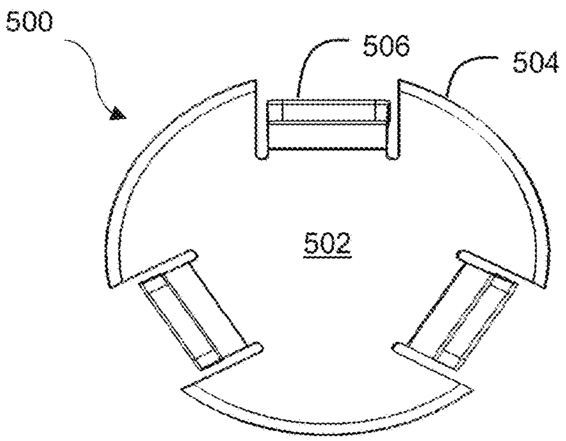

FIGS. 5A and 5B illustrate perspective and top views, respectively, of a bottom clamp plate 500 in accordance with one embodiment. The bottom clamp plate 500 may include a base 502 with radius or chamfer 504 about its perimeter. The chamfer 504 or radius may restrict the radius of flexure about the edge of the plate 500, eliminate or reduce the likelihood of the plate itself puncturing or cutting the FPC under flexure conditions, etc. The lack of a chamfer or radius (on one or both sides of a clamp component) in certain illustrations of certain embodiments herein shall not be construed to imply that certain parts should not or do not have radii or chamfers about their outer radius/edge.

The bottom clamp plate 500 may further include one or more tabs 506, pins, or other features that extend above the FPC-side of the bottom clamp plate 500. These tabs 506 may extend above the base 502, through the FPC, and through the corresponding slots in a top clamp plate such as the slots 402 of the top clamp plate 400 of FIG. 4. In some embodiments, the bottom clamp plate 500 may have slots that accept tabs, pins, or other features of the bottom plate or, in some embodiments the top and bottom plate may each have one or more slots and one or more tabs, pins or other features, the functions of which are in like manner to that which is described with respect to, without limitation, FIG. 4 and FIG. 5.

In some embodiments, instead of tabs, pins, etc., a bottom clamp plate may have one or more holes or slots that align with corresponding holes or slots in a top clamp plate such as top clamp plate 400. There may be multiple methods for fixing the top and bottom plates together with fasteners passing through these holes, such as rivets, bolts, screws, spot welds, thermal staking, etc.

In some embodiments, the bottom clamp plate may comprise one or more holes or may comprise an annulus to allow some area of the bottom side of the FPC to be populated with components, to expose test points or pads, to allow for coupling to other thermal management devices, etc. In some embodiments with annular bottom plates, the same type of component may be used for both the top and bottom clamp plates. Such clamp plates may be attached to each other via one or more fasteners or equivalent component or technique. In some embodiments, top or bottom clamp plates may incorporate features to increase their surface area, such as ridges or fins, thereby reducing their thermal resistance to the ambient air, to otherwise improve thermal transfer, or to better take advantage of forced air cooling or convective airflow.

Figure 6A:
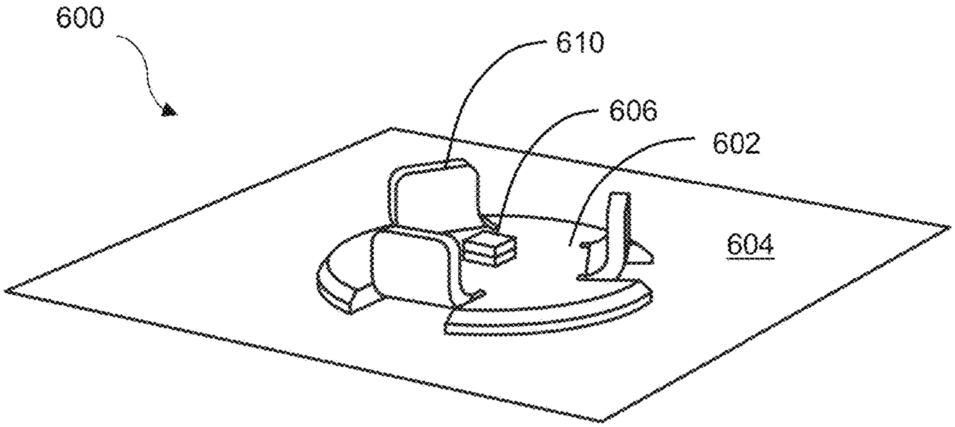
FIGS. 6A and 6B illustrate a bottom clamp plate and a top clamp plate, respectively, in an assembled state in accordance with one embodiment.
Figure 6B:
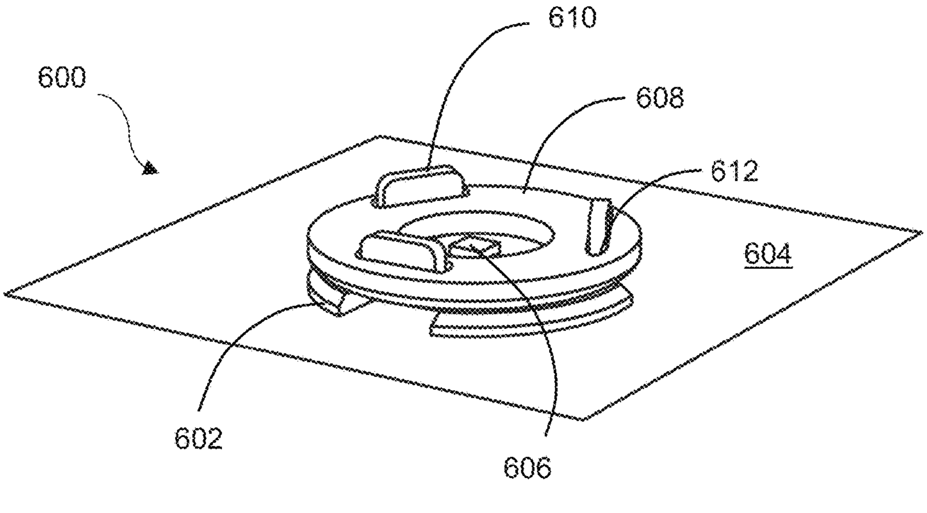

FIGS. 6A and 6B illustrate an annular clamp assembly 600 in accordance with one embodiment. FIG. 6A illustrates a bottom clamp plate 602 below a circuit board 604 (e.g., an FPC, illustrated as transparent) in accordance with one embodiment. In the context of the present application, "board" and "FPC" may be used interchangeably. The bottom clamp plate 602 may be similar to the bottom clamp plate 500 of FIGS. 5A & 5B, for example. The board 604 also has a light emitter 606 disposed thereon.

FIG. 6B illustrates a top clamp plate 608 in operable connectivity with the bottom clamp plate 602. For example, tabs 610 of the bottom clamp plate 602 may extend through slots 612 of the top clamp plate 608. In some embodiments, the tabs 610 may be bent, swaged, peined, staked, or welded to retain the assembly. As seen in FIG. 6B, the circuit board 604 is positioned (i.e., clamped) between the bottom clamp plate 602 and the top clamp plate 608. As seen in FIG. 6B, the light emitter 606 sits below the upper surface of the top clamp plate 608. In the context of the present application, "during clamping" may refer to at least the period or state in which a board such as the board 604 is clamped between a top clamp plate and bottom clamp plate. In some embodiments, the pressure exerted by the top clamp plate and bottom clamp plate on the board may be specified and regulated or limited during assembly or manufacturing and, in some embodiments, the pressure may be zero or small enough to allow some movement of the plates with respect to and parallel with the board, which may reduce shear forces or allow for small adjustments in position during assembly with other components.

In some embodiments, a thermal compound or equivalent (not shown) may be applied to the FPC-facing surfaces of the bottom clamp plate 602, the top clamp plate 608, or both. The diversity of thermal compounds may comprise, without limitation, liquids, gels, pastes, putties, and sheets and that thermal compounds may or may not be electrically conductive and may or may not have adhesive properties. In some embodiments, the plates are designed such that the connecting structures are press-fit into corresponding holes or slots. As discussed above, some embodiments use mechanical fasteners instead of tabs/slots or equivalent attachment mechanisms. In such embodiments, installation of such fasteners would typically occur subsequent to the state depicted in FIG. 6B.

The tolerance of fit between the tabs and the slots may be somewhat loose to allow for manufacturing tolerances to be relaxed. This may reduce costs and/or reduce the number of parts rejected due to not meeting tolerances. Additionally, a loose fit may make assembly of the annular clamp more efficient or less difficult. In some embodiments, tabs, slots, or other features may also function to assist in assembly and/or manufacturing steps, for example, in alignment with tooling, in automated parts handling, in interactions with computer or machine vision systems, etc.

In other embodiments, the fit between slots and tabs (or equivalent connecting structures) may be an interference fit or a press fit to provide partial or full retention of the assembled clamp without further manufacturing steps relating to the clamp. This may ease subsequent operations by preventing the annular clamp from disassembling during handling.

Equivalent/isomorphic embodiments can be implemented wherein a top clamp plate comprises one or more tabs, pins, or other structures that are received by one or more slots or holes in a bottom clamp plate or wherein the top plate and bottom plate each has one or more tabs, pins, or other structures and one or more holes or slots to receive tabs, pins, or other structures. The design decisions as to the number and arrangement or placement of such features may be made according to arbitrary preferences, manufacturing or manufacturability constraints, costs, interchangeability, mechanical or thermal performance, or other such factors and that, irrespective of such decisions, result in embodiments that are isomorphic and equivalent to those described in the present disclosure.

The annular clamps described herein or a portion thereof may serve as a primary or a significant method of heat rejection and thermal management for the associated lighting element(s) or electronics. Additionally, the annular clamp may maintain stability around and protect solder joints, e.g., between the FPC and a lighting element. The protection and robustness afforded by an annular clamp in and at its edge may be symmetric with respect to the direction of flexure and may mitigate effects of shear forces that could occur at the boundary between an adhesive-attached annular plate (or equivalent) in certain conditions of flexure and/or tension.

One or both of the top and bottom clamp plates may comprise a polymer, plastic, or other non-metallic material appropriate for goals of the disclosed embodiments. These include the ability to fasten or fix parts comprising such material using thermal deformation, heat staking, ultrasonic welding, cement, or other method whether available now or invented hereafter.

Figure 7A:
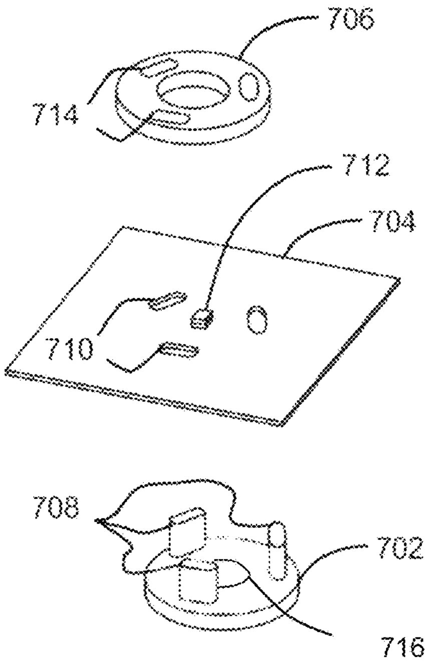
FIGS. 7A-7D illustrate various views of a bottom clamp plate, circuit board, and top clamp plate in accordance with one embodiment.
Figure 7B:
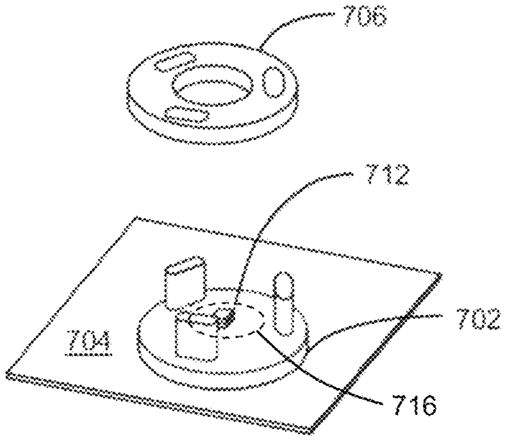

A non-metallic embodiment of an annular clamp assembly is illustrated in FIGS. 7A & 7B. FIG. 7A illustrates a bottom clamp plate 702, a board 704, and a top clamp plate 706. As in previous embodiments, the bottom clamp plate 702 may include a plurality of tabs 708, the circuit board 704 may include a light emitter 712 and plurality of apertures or slots 710 to receive the tabs 708, and the top clamp plate 706 may include a plurality of slots 714 to receive the tabs 708. The bottom clamp plate 702 is configured with or otherwise supports one or more substrate plates 716. The substrate plate 716 may similarly be installed on the underside of the board 704.

FIG. 7B illustrates the bottom clamp plate 702 operably positioned with respect to the board 704. That is, the tabs 708 have been inserted into the slots 710 of the board 704.

Figure 7C:
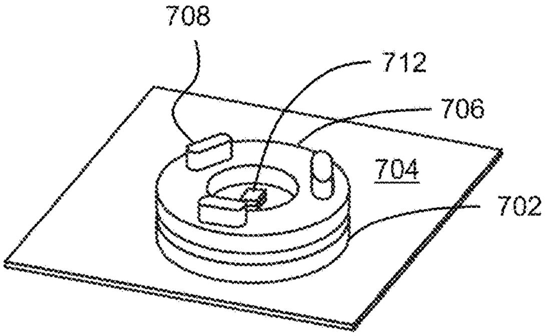
Figure 7D:
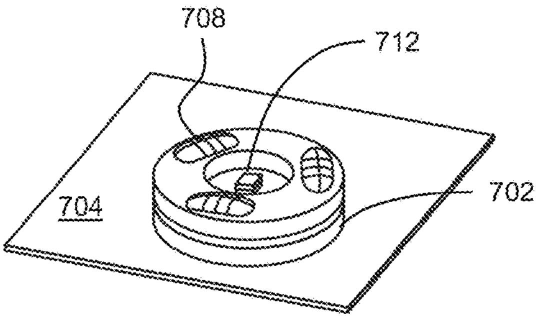

The bottom clamp plate 702 comprises a polymer or plastic such that a method such as heat staking may permanently fix the bottom clamp plate 702 and the top clamp plate 706 together, as seen in FIGS. 7C and 7D. FIG. 7C illustrates the assembly before a heat staking procedure. In this state, the top clamp plate 706 has been positioned over the board 704 and the bottom clamp plate 702 such that the tabs 708 extend through the slots 714 of the top clamp plate 706.

FIG. 7D illustrates the fully assembled clamp after heat staking is complete. That is, FIG. 7D illustrates the tabs 708 in a melted state resultant from the heat staking procedure intended to fix the assembly components together.

Polymer annular clamps may be used in applications in which the physical and mechanical protection of an annular clamp is desired or required, but supplemental heat rejection or thermal management is not required. These specifications may be associated with low-intensity lighting applications; with SFLMs that are installed in cold locations or in locations with sufficient moving/forced air; or non-lighting applications, such as protecting an optical or acoustic sensor or another electronic component that requires physical protection without enhanced thermal management. In some embodiments, the polymer plate having tabs 708 may be used in conjunction with a metallic plate.

Polymer annular clamps may advantages over metallic materials based on one or more of cost, weight, manufacturability, or other characteristics. As previously discussed in the context of annular plates, thermally-enhanced polymers may be used in some embodiments to strike a compromise among thermal resistance, cost, weight, etc.

A polymer bottom clamp plate may comprise an annulus, i.e., a hole located directly below the lighting element(s) and, in such embodiments, there may be installed a substrate plate to act as a heat spreader/heatsink. In such embodiments, the bottom clamp plate may function to mechanically retain the substrate plate, which may then couple to an FPC via thermal compound or thermal adhesive. In this configuration, the bottom clamp plate retains the substrate plate while the adhesive sets.

In some embodiments, a metallic substrate plate or equivalent is incorporated into a polymer bottom clamp plate (e.g., via over-molding, adhesive, clip(s), or press fit) such that, with thermal compound applied, the substrate plate is thermally-coupled to the FPC. In some embodiments, interchangeable bottom clamp plates with or without substrate plates may be used. This may balance cost and performance across a product line comprising SFLMs of different luminous output/power, wherein lower-power units may not require as much heat rejection as higher-power units.

In some embodiments, one or both of the top or bottom clamp plates may incorporate an o-ring groove or equivalent on the plane of their surface that contacts the FPC. In such embodiments, the groove may be designed such that an adequate environmental seal is established while still ensuring sufficient pressure to maintain a prescribed degree of thermal coupling between the FPC and the plate.

The clamp plates described herein may be used with rigid or rigid-flex PCBs (e.g., in applications where flexure is not relevant or of key importance) for mechanical protection and/or thermal management/heat rejection. In some embodiments, bottom clamp plates having a range of tab lengths to accommodate varying board thicknesses may be used interchangeably with a common top clamp plate and protective elements. This achieves a common thermal management and mechanical protection system for both flexible and rigid applications using the same tooling, supply chain, safety accreditations, etc.

Some embodiments may incorporate a clearance hole the bottom clamp plate and a threaded hole in the top clamp plate to enable the clamp to be fastened to another structure. The respective fastener may or may not be responsible for retaining the clamp to the FPC or for the provision of clamping force between the plates and the FPC. Other permutations of clearance and threaded holes may be arranged among the top and bottom clamp plates to allow a fastener to be fitted from the front or back of the FPC or to thread into a threaded hole or nut external to the FPC assembly. Snap- or press-fit threaded inserts or nuts may be employed in preference to threading the material of a top or bottom clamp plate and that threaded inserts may be preferable in the case of plates made from polymers.

The present application also discloses an apparatus and method for restricting the bend radius of circuit boards and protecting them from mechanical damage. A matrix superstructure comprises a matrix of interlocking matrix elements arranged in a planar shape. In some embodiments, the interlocking features or the matrix elements are fabricated from a flexible or semiflexible material, examples of which include urethane polymers, elastomeric materials, rubber and rubber-like materials, low-durometer plastics and polymers, closed-cell foams, or the like.

In some embodiments, the interlocking features or the matrix elements may be made of different materials or materials with different properties (such as low- and high-flexibility variants of the same type of material). In some embodiments, the matrix superstructure is manufactured as a monolithic sheet or tile and, in some embodiments, this monolithic sheet or tile may be comprised of the same material. The methods and processes of manufacture of matrix superstructures may vary depending on the selected material(s). The flexibility or effective spring coefficient of an interlocking feature may be controlled by material selection, the geometry and aspect ratio of an interlocking feature, or the interface or connection between an interlocking feature and a matrix element.

An individual interlocking feature may connect two or more matrix elements or portions thereof. Some embodiments may not comprise discrete interlocking features and matrix elements may be connected to or formed as part of a common layer, which serves as the interconnection feature among many matrix element and thus serves as a "planar interconnection feature." In some embodiments, the thickness of a planar interconnection feature may vary and, in some embodiments, such variance and the locations of such variances may function to control the radius-of-curvature of the matrix superstructure and FPCs connected to the same.

Figure 8:
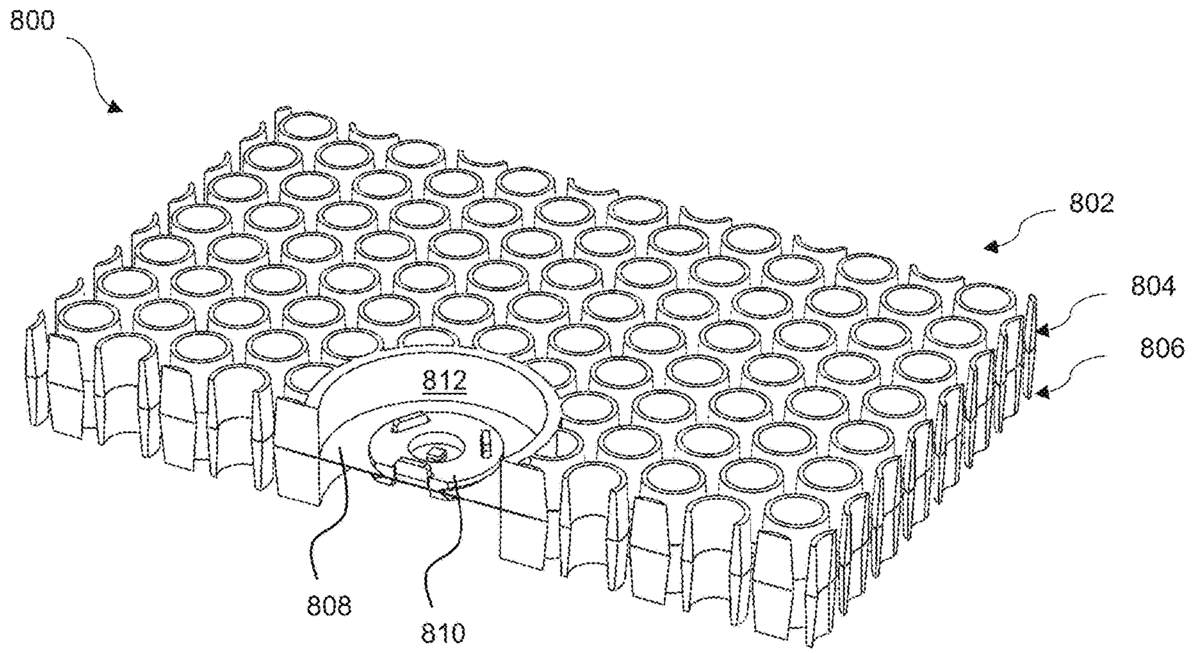
FIG. 8 illustrates a cross-sectional view of a superstructure assembly in accordance with one embodiment.

FIG. 8 illustrates a cross-sectional view of an assembly 800 in accordance with one embodiment. The assembly 800 comprises a matrix superstructure 802 with a top portion 804 and a bottom portion 806, a board 808, and an annular clamp 810.

The matrix superstructure 802 may comprise one or more areas devoid of matrix elements and interlocking features and, in some embodiments, the perimeter of such void may be reinforced. An example of such a void is where the clamp 810 is positioned. In the depicted embodiment, the top portion 804 and the bottom portion 806 are aligned such that the centers of the matrix elements (e.g., where the clamp 810 is positioned) of the respective panels are coincident. The reinforcement of this void in the center of this embodiment is visible and appears as a band 812 around the void area.

Figure 9:
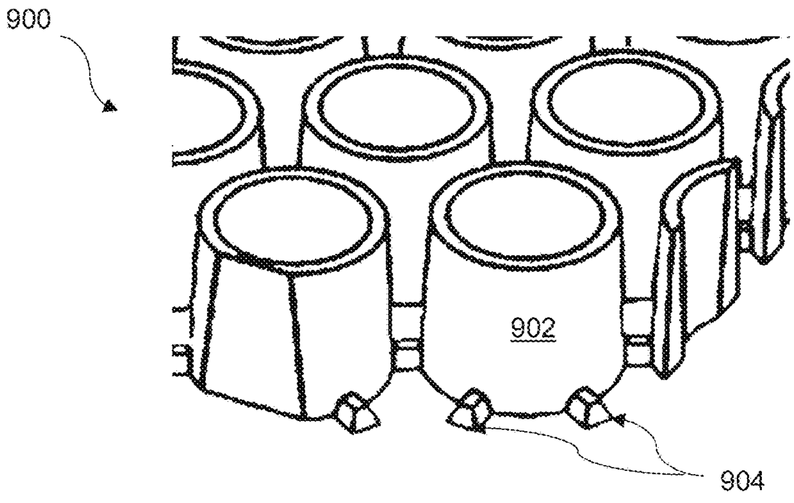
FIG. 9 illustrates a detailed view of a superstructure in accordance with one embodiment.

FIG. 9 illustrates a detailed view of a superstructure 900 such as the superstructure 802 of FIG. 8. The matrix elements 902 are formed as tapered cylinders or sections of hollow cones and are linked by interconnecting features 904. In the depicted embodiment, each matrix element 902 connects to six adjacent matrix elements via six respective interconnecting features and forming a hexagonal matrix. In the depicted embodiment, the bottoms of the matrix elements 902 and the interconnecting features are flat such that the matrix superstructure 900 lays flat on a board (not shown in FIG. 9).

A matrix superstructure such as the superstructures of FIGS. 8 and 9 may be installed on one or both sides of an SFLM or FPC to limit its bend radius, prevent folding or creasing, or to prevent mechanical damage. In some embodiments, the bend radius of a matrix superstructure may be limited by the difference in height of the matrix elements relative to the interconnecting features. For example, interconnecting features may be ten times shorter than the matrix elements. In some embodiments, the bend radius of a matrix superstructure may be limited by the shape of the matrix elements and, in some embodiments, this limitation may be controlled by designing matrix elements to have a specific taper or taper angle. For example, a more acute taper angle will permit a smaller bend radius.

In some embodiments, the bend radius of a matrix superstructure may be controlled by the length of the interconnecting features. For example, longer interconnecting features will permit a smaller bend radius compared to shorter interconnecting features. In some embodiments, the bend radius of a matrix superstructure may be limited by the width of matrix elements or the width of a matrix element relative to the corresponding interconnecting features. In some embodiments, the bend radius of a matrix superstructure may be limited or controlled by the mechanical properties of the materials(s) comprising the matrix superstructure. These material features may include, but are not limited to, the durometer of the material or the geometry of parts of the matrix superstructure, such as the thickness or cross-sectional area thereof.

In embodiments having matrix superstructure portions on the top and bottom of an SFLM or FPC such as in FIG. 8, the portions may be aligned to achieve symmetric and complementary curvature control. In some embodiments, such as in applications where curvature control may be required in only one direction (i.e., concave curvature of one side of the SFLM or FPC), a single matrix superstructure portion may be fitted. In embodiments having asymmetrical radius-of-curvature requirements, the curvature restriction of the top or bottom portions may be controlled via the aforementioned methods, such as altering the taper angle of matrix elements or altering the height of interconnecting features.

The geometry of a matrix superstructure and that of its constituent matrix elements and interconnecting features may be designed to minimize the amount of material used in a matrix superstructure panel or the weight of said matrix superstructure. The design of a matrix superstructure may allow heat transfer between the enclosed FPC and the ambient via convection and radiation. For example, the matrix elements may be hollow and the interconnecting features may be relatively narrow, leading to a large portion of the FPC being exposed to the environment. In some embodiments, the matrix superstructure or constituent components thereof may comprise a low-thermal-resistance material, i.e., such that the matrix superstructure provides some degree of heat spreading or heat sinking capacity. In some embodiments, the design of the matrix superstructure may prevent external contact with the enclosed FPC to provide enhanced protection from the environment. This may reduce or eliminate requirements to conformally coat or otherwise directly encapsulate the FPC. In these embodiments, low-thermal-resistance materials may be chosen to compensate for losses in convective and radiative cooling capacity.

The design of the matrix superstructure may protect a board from loads in compression, tension, shear, or some combination thereof. The tuning of parameters such as material properties and the geometry of the matrix components allows tuning of such protection. Additionally, the hollow cylindrical/conical shape of the matrix elements in the embodiments depicted in the present disclosure perform particularly well under compression.

In some embodiments, the matrix elements 902 of FIG. 9 may be arranged in a hexagonal pattern to provide relatively uniform flexibility regardless of the orientation of flexure. However, the matrix elements may be organized on other patterns, including patterns comprising matrix elements of two or more geometries or sizes. Variations in patterns and/or matrix element geometry or size may effectuate specific mechanical or other performance properties or may be used for aesthetic purposes.

Referring back to FIG. 8, the matrix superstructure portions 802 and/or 804 may comprise a material that maintains a specified degree of flexibility over a specified range of temperatures. For example, some materials become brittle at low temperatures and may be ill-suited for embodiments intended for use in cold climates.

The material of the matrix superstructure 802 and, particularly, the top and bottom portions 804 and 806 may be chosen to be wear-resistant to provide a longer service life. In some embodiments, the elasticity and tensile strength of the material of the top and bottom portions 804 and 806 may be chosen to control radius-of-curvature and/or how the matrix superstructure(s) respond to attempts to flex it beyond the limiting radius-of-curvature.

For example, some embodiments may incorporate more elastic interconnecting elements to effectuate gradual resistance to over-curvature while other embodiments may benefit from a less elastic but higher-strength material that will strongly resist over-curvature—potentially at the cost of mechanical failure under excessive loading. In like manner, some embodiments may use materials with specific tear resistance to affect the overall tear-resistance of the assembled SFLM.

The voids in the matrix superstructure 802 may permit the installation of components, such as light emitters, on the circuit board 808. The thickness of the matrix superstructure 802 around such components may provide additional protection from mechanical insult. This protection may be enhanced in some embodiments by the incorporation and design of the reinforcement of such voids, such as by band 812 as previously discussed herein. While the voids of the illustrated embodiments of the present disclosure are all circular in shape, some embodiments may comprise voids of other shapes, such as, without limitation, ellipsoids, ovals, triangles, quadrilaterals, polygons, etc.

A matrix superstructure may comprise zero voids or may comprise many voids, or have voids of multiple sizes and/or shapes. As seen in FIG. 8, the top and bottom portions 804 and 806 have corresponding voids that line up at the same location relative to each other and the circuit board 808. In some embodiments, a matrix superstructure may have a void on one side of the circuit board but not on the other.

The reinforcement or band 812 around a void may provide mechanical support for covers, such as optical elements or protective layers. In some embodiments, the reinforcement around a void may serve as a form for installation of an encapsulant, sealant, or other liquid or gel compound. The geometry of a void, such as its depth and the thickness of its reinforcement may be chosen to provide additional protection to the exposed circuit board and components therein. For example, the height and thickness of the band 812 around the clamp 810 provides protection of the exposed circuit board 808 therein as well as further protection of the light emitter on the clamp 810.

The surface of a matrix superstructure proximate to the board 808 may be relieved in some areas (e.g., by making matrix elements shorter in said areas) to provide clearance for components. In some embodiments, a matrix superstructure may further comprise one or more rigid areas to prevent flexure in the region of certain components. In some embodiments, a rigid area may be constructed by embedding a rigid material in the respective part of the matrix superstructure.

In some embodiments, the matrix superstructure 802 and the circuit board 808 are attached in a manner that allows the board 808 to “float” between the layers of superstructure 802. For example, the surfaces of the board 808 and the superstructure need not be bonded together but may be loosely held in a manner that allows the surfaces some degree of movement with respect to each other. Allowing the board 808 to float eliminates shear forces and differential tension between the circuit board 808 and the matrix superstructure due to bending or thermal expansion.

Figure 10:
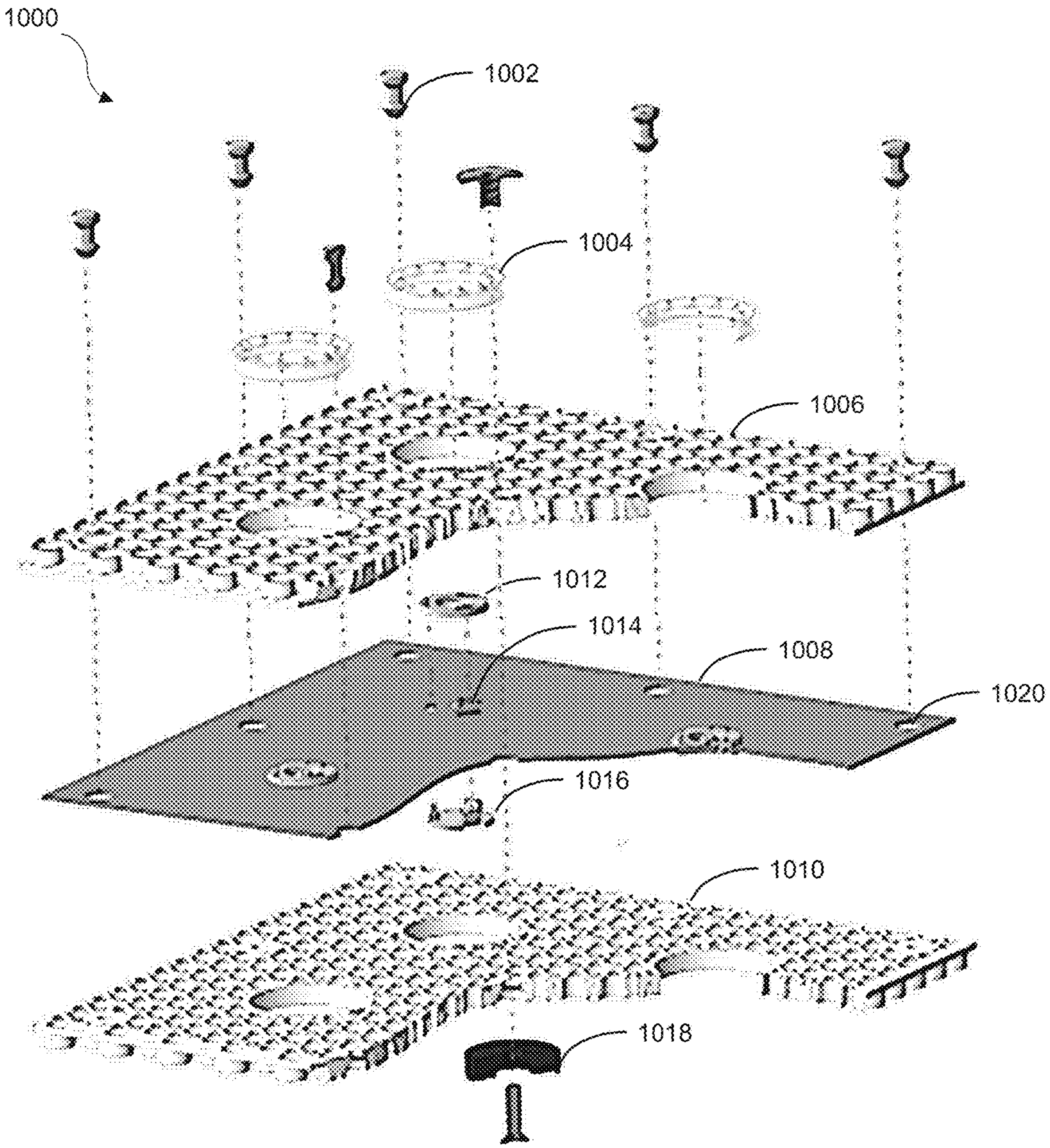
FIG. 10 illustrates an exploded view of an assembly of a semi-flexible lighting module (SFLM) in accordance with one embodiment.

FIG. 10 illustrates an exploded view of an assembly 1000 of an SFLM in accordance with one embodiment. Pins 1002 mechanically connect the top portion 1006, the board 1008, and the bottom portion 1010. The pins 1002 pass through the holes 1020 in the board 1008. The pins 1002 may be any type of press-fit, snap-fit, twist-lock, or other similar fastening methods and that functionally-equivalent embodiments whether available now or invented hereafter. In some embodiments, fasteners, such as bolts or rivets may be substituted for or used in combination with the pins 1002.

The assembly 1000 further includes a top clamp plate 1012 and a bottom clamp plate 1016 that clamp the circuit board 1008 to provide an annular clamp. The formed clamp also subtends and provides protection and thermal management for the light emitter 1014.

The bands or covers 1004 may be configured with the top portion 1006. In some embodiments, a cover 1004 may be an optical element, such as a lens, diffuser, filter, or a reflector. In some embodiments, cover 1004 may be omitted and, in some embodiments, the cavity formed by a void may instead be filled (partially or fully) with an encapsulant, sealant, clear polymer, or other substance or material to provide protection for or enchance the performance of the apparatus in general or components thereof, such as lighting element. Retention discs 1018 or other features for retaining assembly 1000 may be attached to bottom portion 1010 using fasteners (not labeled in FIG. 10).

The SFLMs described herein may comprise components of a retention system to attach an SFLM to another structure, such as the ceiling of a shelter or inside a photographic lighting apparatus. A retention mechanism may include interlocking components, such as hook-and-loop fasteners. A retention mechanism may be attached to a panel by a bolt and a nut. In this configuration, a nut may be pressed into the top portion of the matrix superstructure through a provided hole therein and a corresponding hole in a circuit board, the bolt is inserted into a retention disc, and the bolt is passed through a hole in the bottom portion of the matrix superstructure and tightened to a specified torque. In some embodiments, methods for retention of threaded fasteners may include applying thread locking compound to threads of fasteners may be employed and, in some embodiments, such retention may be salient to prevent loosening of fasteners due to vibration or temperature-cycling or other such purposes for the use of such methods known to one of ordinary skill in the art.

Figure 11:
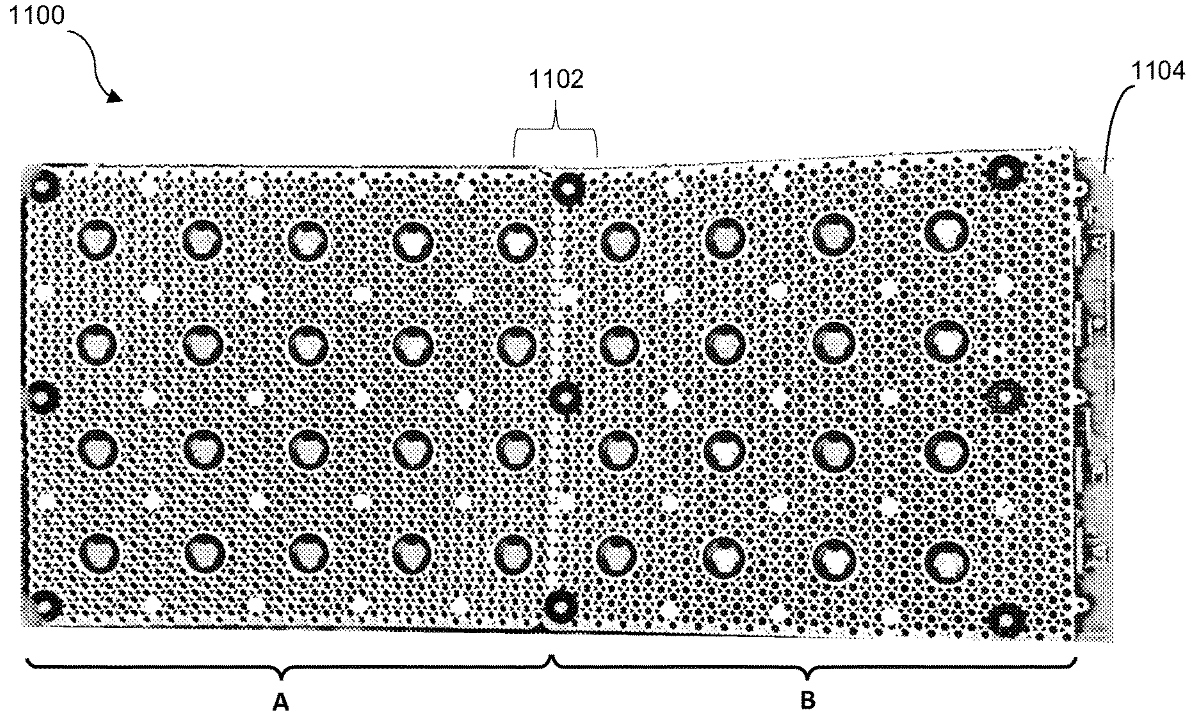
FIG. 11 illustrates a semi-flexible lighting module (SFLM) in accordance with one embodiment.

FIG. 11 illustrates an SFLM 1100 in accordance with one embodiment. The SFLM 1100 includes two interlocking matrix superstructures, A and B. Matrix superstructures A and B are joined at junction 1102. One end of a circuit board 1104 (e.g., a FCB) is seen protruding from superstructure B.

Figure 12:
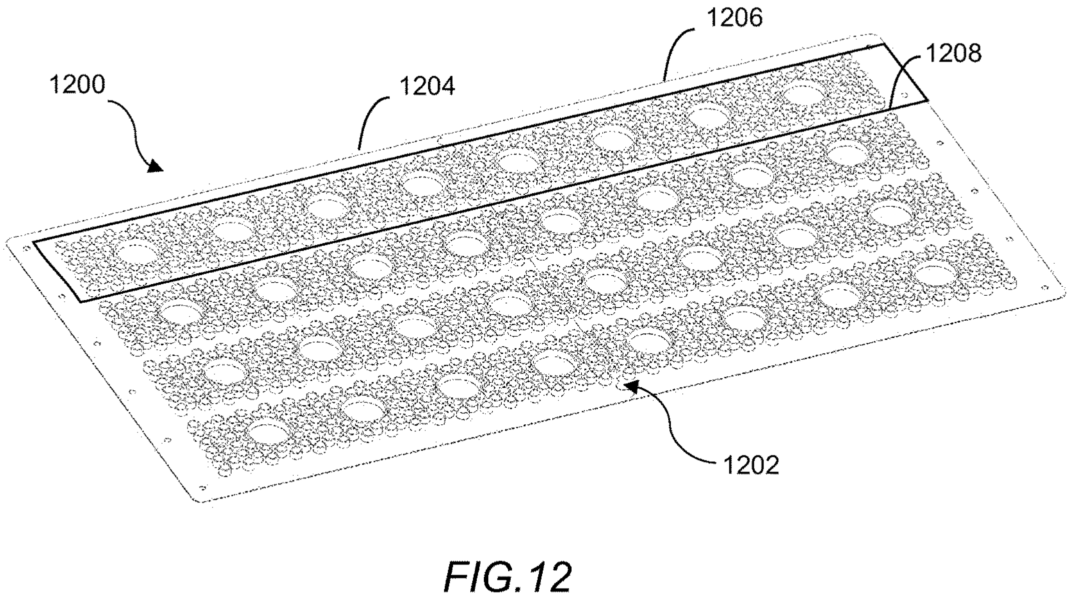
FIG. 12 illustrates a matrix superstructure that employs planar interconnecting features in accordance with one embodiment.

FIG. 12 illustrates a matrix superstructure 1200 in accordance with an embodiment that employs planar interconnecting features. The interconnecting features 1202 join superstructures 1204 and 1206. In this embodiment, the superstructure 1200 accommodates four separate circuit boards, each running horizontally beneath a portion or row of the matrix superstructure 1200. The interlocking features 1202 may include a plurality of pins, such as wye-shaped pins, that are inserted into or otherwise accepted by matrix elements of a superstructure. Accordingly, the coupling of multiple superstructures may be effectuated by the inclusion of vertical coupling elements on the edge of one tile that press-it into matrix elements of a second tile.

The region 1208 indicates the notional location of one such FPC, according to some embodiments. Some embodiments may comprise wider FPCs such as those that subtend two or more rows of matrix superstructure. In these configurations, the regions of such FPCs between the rows may be designed such that such regions do not comprise functional circuit components or conductors. These regions may have significant amounts of copper removed, or may be slotted, cut, or have cut-outs according to specified geometries. In some embodiments, there may be no dependencies between rows or functional electrical connections through non-row regions. Alternatively, such dependencies or functional electrical connections are restricted to one edge of the FPC, e.g., where it connects to another system component. These may be referred to as "partitioned FPCs."

The region 1208 of the superstructure 1200 comprising electronic circuits and traces in a one-FPC-strip-per-row embodiment is indicated by the oblong shaded region on the first row. Embodiments of FPC strips or partitions and corresponding matrix superstructures may have many different geometries such as oblong rectangles, and definite embodiments of geometries thereof may be designed for specific use cases, parameters, etc. The strip or region 1208 may, in some embodiments, comprise two or more FPCs, which may or may not interconnect electrically and may or may not be independent of one another. As a non-limiting example, an FPC strip could be divided into multiple shorter sections or two interdigitated partitioned FPCs could be used, one entering from the left and one entering from the right.

Figure 13:
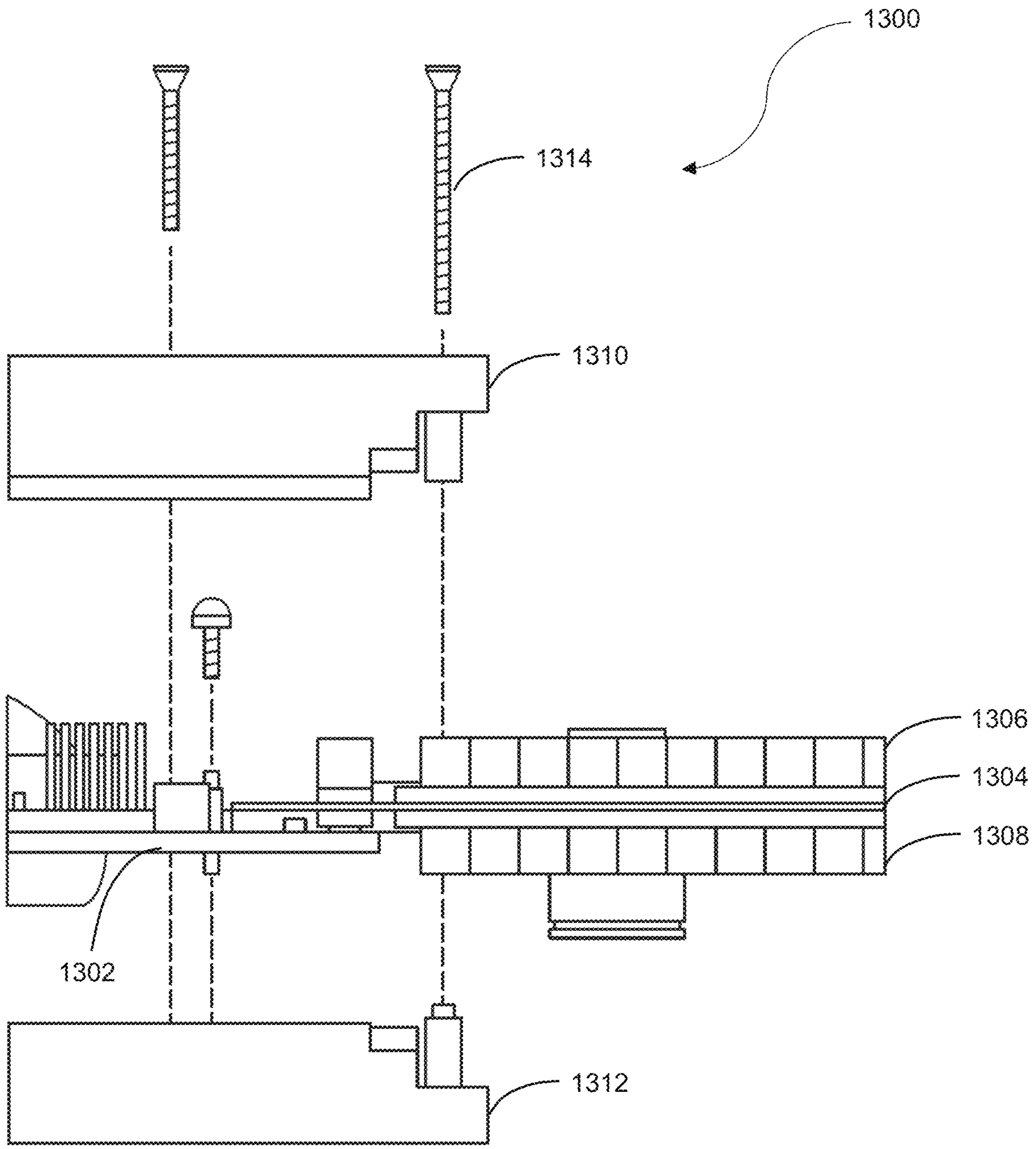
FIG. 13 illustrates an SLFM and printed circuit board in accordance with one embodiment.

In some embodiments, an SFLM connects to a rigid body such as a rigid PCB. The rigid PCB may comprise electronic components that may power, control, monitor, or otherwise interact with the SFLM or enable the connection of conductors or cables to the SFLM. FIG. 13 illustrates a view 1300 of an SLFM and printed circuit board in accordance with one embodiment. A rigid circuit board 1302 is attached to an FPC 1304 by one of a multitude of mechanisms of electromechanical connection techniques. The FPC 1304 is protected by matrix superstructure top portion 1306 and matrix superstructure bottom portion 1308. Protective enclosure halves 1310 and 1312 each with an environmental seal, are joined to enclose board 1302, the edge of the SFLM (corresponding to 1304, 1306, 1308), and the connection between board 1302 and FPC 1304.

In the embodiment, the protective enclosure is secured by several fasteners 1314, some of which pass through matrix elements of the respective matrix superstructures. The fasteners may provide additional mechanical support and environmental protection for components or traces proximate to the edge of the FPC 1304. In some embodiments, the size of rigid board 1302 is kept to a minimum to reduce its impact on flexibility of the SFLM.

Some embodiments may comprise an SFLM comprising a top portion, an FPC layer, and a bottom layer, wherein the top portion comprises one or more matrix superstructures, the FPC layer comprises one or more FPCs, and the bottom portion comprises a fabric, textile, woven material, elastomeric material, rubber or neoprene material, or other material to provide a flexible backing material for an SFLM (collectively "fabric backing"). To the extent that such embodiments comprise only one layer of matrix superstructure, we may refer to the matrix superstructures thereof hereinafter as single-layer matrix superstructures. We will refer to embodiments comprising a fabric backing as "fabric-backed", e.g., "fabric-backed SFLMs." The term "fabric" is a generalization for a wide range of materials and shall not be construed as limiting.

Figure 14:
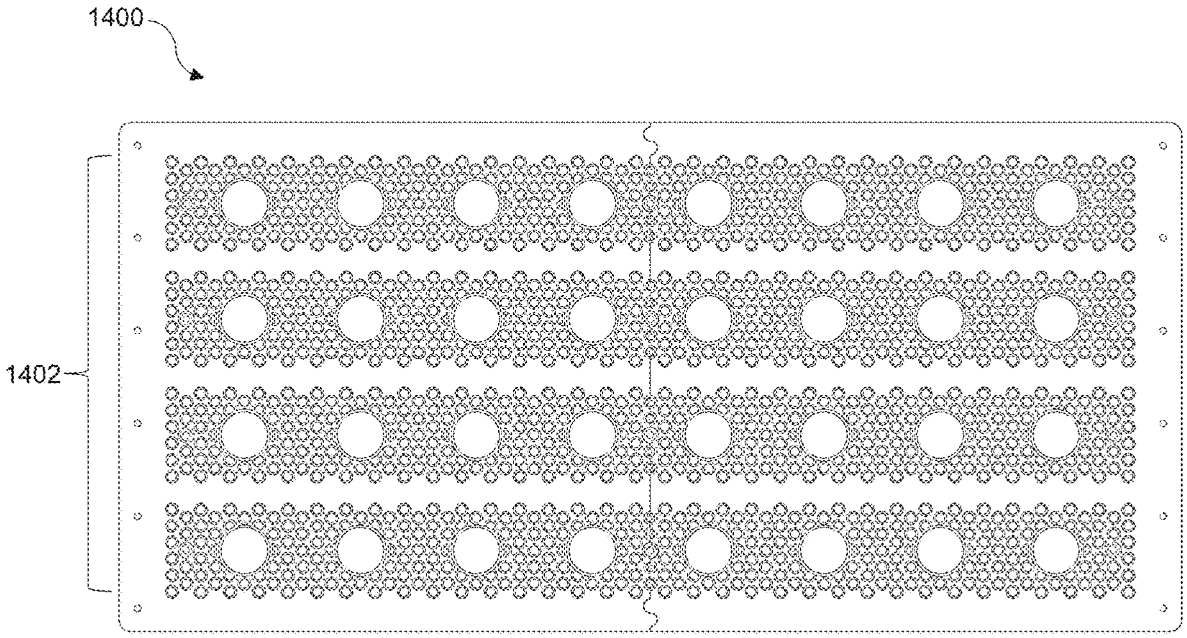
FIG. 14 illustrates a single layer superstructure in accordance with one embodiment.

FIG. 14 illustrates a single layer superstructure 1400 in accordance with one embodiment. This embodiment is designed to be stitched or sewn onto a flexible fabric or other backing material. This embodiment may comprise four FPC strips 1402 that run laterally as shown in FIG. 14. Alternatively, the superstructure 1400 may comprise one or more partitioned FPCs having partitions located under each row.

Regions of the matrix superstructure 1400 may comprise thin and flat regions to allow for a smaller radius-of-curvature in the respective areas. In some embodiments, a plurality of separate, oblong FPCs may be incorporated in preference to a larger, monolithic FPC. As also seen in FIG. 14, the matrix superstructure 1400 comprises two matrix superstructures that interlock with each other.

Figure 15:
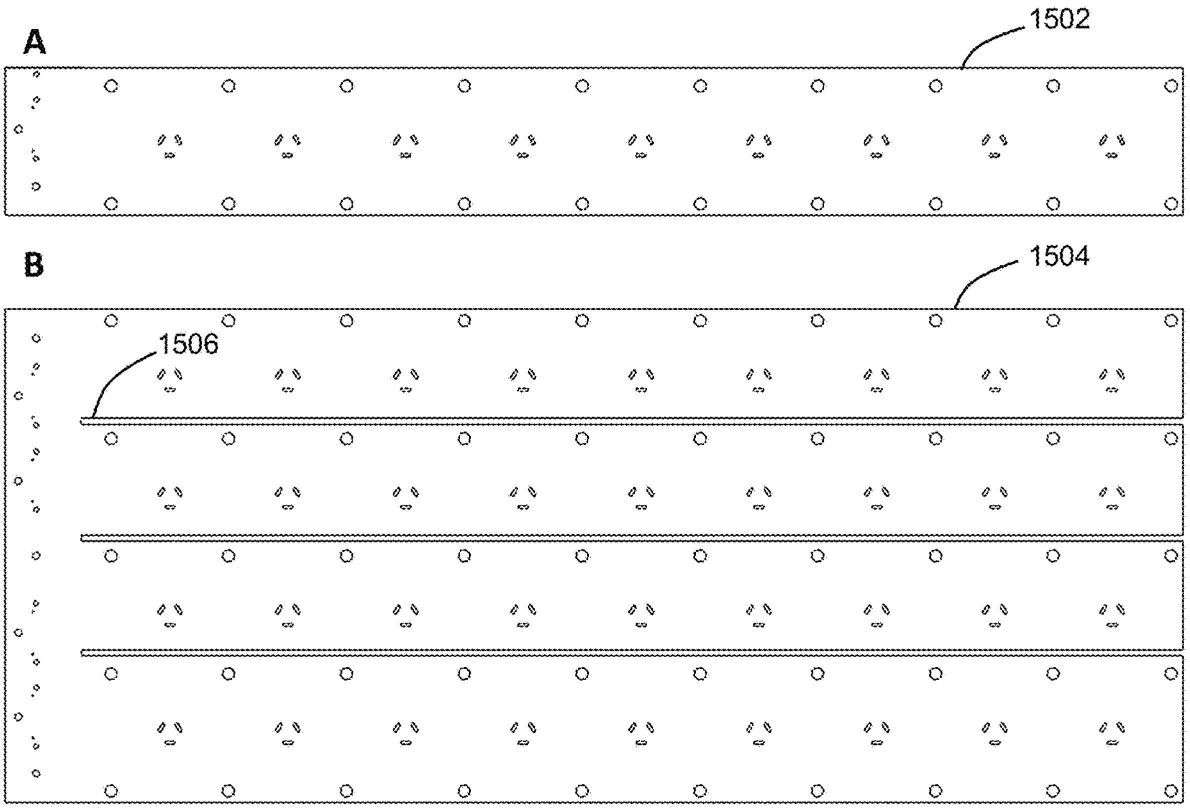
FIGS. 15A and 15B illustrate a flexible printed circuit (FPC) and a partitioned FPC, respectively, in accordance with one embodiment.

FIG. 15A illustrates an FPC strip 1502 in accordance with one embodiment. FIG. 15B illustrates a partitioned FPC 1504 in accordance with one embodiment. Substantially identical electrical function can be implemented with the FPC strip 1502 or with partitioned FPCs 1504 and each form has advantages and disadvantages with respect to, without limitation, cost and difficulty of manufacture or assembly, cost, and complexity of the assembly of an SFLM panel; modularity, redundancy, or fault tolerance; and mechanical characteristics such as minimum permissible bend radius.

The aspect ratio of an FPC strip and the extent of component-and-trace-free space or the corresponding space of a partitioned FPC 1504 may vary considerably among different embodiments, all of which embody the teachings herein. The geometry of FPC material milled or cut away between partitions may vary considerably among different embodiments or may vary within a given embodiment; such a cut-out is notated by reference 1506.

In some embodiments, the partitioned FPC 1504 may be configured such that one or more partitions can be detached or cut off and the removed partitions may function as a separate FPC strip. In some embodiments, such division of a partitioned FPC into a combination of one or more FPC strips and one or more partitioned FPCs can be performed without affecting the function of the partition(s) and, in some embodiments, such division may be performed on a partially- or fully-assembled FPC.

Figure 16:
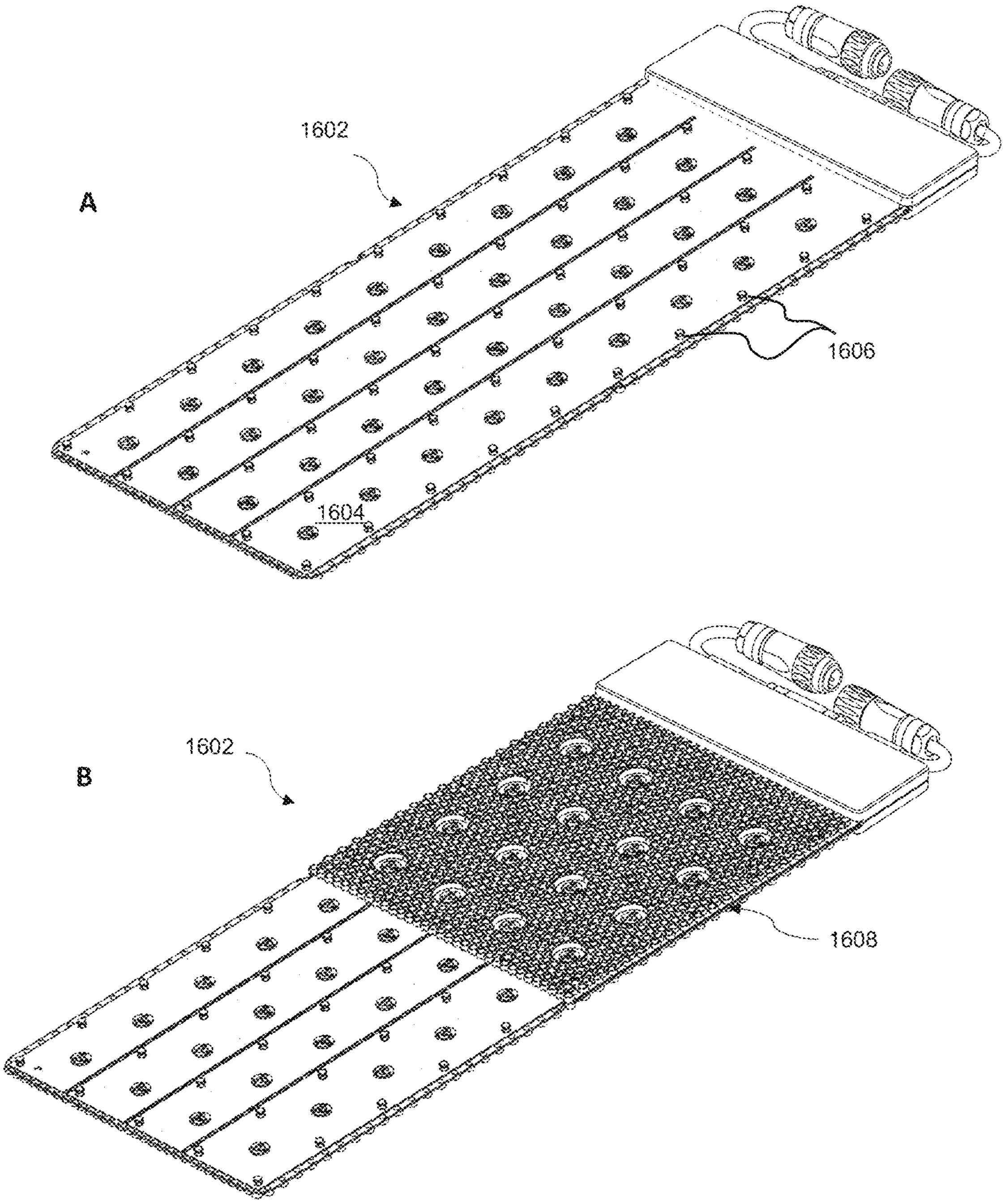
FIGS. 16A and 16B illustrated a partially assembled FPC in accordance with one embodiment.

FIG. 16A illustrates a partially assembled FPC 1602 in accordance with one embodiment. Specifically, FIG. 16A depicts a partial assembly prior to installation of a top matrix superstructure. A board 1604 may include a plurality of mounting pins 1606 for receiving a matrix superstructure. FIG. 16B illustrates the FPC 1602 with the addition of a superstructure 1608. Similar embodiments comprising FPC strips could be constructed and the design freedom to locate the strip independently may be useful in some embodiments and may be advantageous compared to designing and implementing a variety of partitioned or unpartitioned monolithic FPCs.

The embodiments discussed herein comprise substantially linear configurations of FPC strips and partitioned FPCs and depict light emitters arranged in an approximately rectilinear grid. However, some embodiments may benefit from or rely on more complex geometries. For example, and without limitation, more complex geometries may be more aesthetically pleasing or may serve a specific function, such as allowing an FPC strip or partitioned strip to conform to a conical or irregularly-shaped surface.

In some embodiments the partitions of a partitioned FPC may be configured to be noncoplanar, such as to cast light over a wider area or angular range. In some embodiments, the cuts between partitions may not be straight lines and, in some embodiments, may not extend through the edge of the FPC. This configuration may leave some material behind at the distal end of the cut, or may comprise two or more cuts that may or may not be colinear.

The matrix superstructures described herein may be manufactured by any one of a plurality of methods. One method may referred to as "over-molding," which involves molding for forming a material over or around a second material. In some embodiments, such over-molding may be performed on or used to assemble FPCs. This assembly process may also involve the installation of non-electronic components, such as mechanical or thermal components.

In some embodiments, over-molding may further encapsulate attachments to the FPC, such as external electronics, connectors, mechanical components, cables, etc. These processes are capable of manufacturing structures and geometries consistent with some embodiments of matrix superstructures described herein.

In some embodiments, the over-molding process is configured such that the molded material does not adhere or only weakly adheres to the FPC and components thereon. This configuration may be effectuated by applying certain compounds such as a mold release to the FPC to coat some or part of the FPC with specific coatings. Some over-molding processes comprise two or more stages, wherein each stage comprises the application of a specific over-molding material or color to create a final over-mold comprising multiple materials, each of which having different properties. The over-molding methods and applications recited herein may be used to fabricate the entirety of the matrix superstructure or may be applied in conjunction with matrix superstructure tiles. For example, over-molding could be performed to the top of an assembly before or after the installation of a polymer matrix superstructure.

The matrix superstructures may be used in some non-flexible or rigid embodiments that require the physical or mechanical protection afforded thereby. Some applications employing matrix superstructures may comprise a combination of multiple PCB technologies, stack-ups, substrates, etc., wherein the matrix superstructure may cover both flexible and rigid regions of one or more PCBs. These may include applications requiring "rigid-flex" technology, wherein a monolithic PCB assembly may comprise a combination of rigid and flexible regions. Some embodiments may incorporate matrix superstructures with rigid-flex PCBs or similar technologies.

The matrix superstructures described herein may be configured to have certain properties that affect the impedance or otherwise the performance of electrical components. These may include effectuating impedance-matching, being transparent or opaque to certain electromagnetic signals or wavelengths, having a controlled dielectric coefficient or related characteristics, reflecting signals, or for the purposes of shielding or isolation. Achieving these properties may involve or depend on material composition, the use of multiple materials; installation or inclusion of a conductive layer, foil, or RF gasketing, geometry, including the locations of voids or the aspect ratios of matrix elements, free space or gaps between a matrix superstructure and a circuit board or component or the absence thereof; composition and location of mounting hardware or accessories; temperature-related changes in impedance or performance, specific controls of radius-of-curvature, etc.

Computer software may be used to optimize or facilitate the design of a matrix superstructure for a particular FPC or other substrate, subject to design parameters and constraints relevant to the performance and characteristics of matrix superstructure. These design parameters and constraints may include, but are not limited to, cost, weight, overall size, volume of material consumed, manufacturability, efficiency, etc. In some embodiments, such optimization may be performed a priori as part of the design and implementation of the respective product. In some embodiments, such optimization and design may be performed dynamically and contemporaneously with other steps in the manufacture, fabrication, or assembly of a specific item.

Such dynamic optimization and design may facilitate the automatic creation of matrix superstructures for custom-ordered or bespoke FPCs or other items or may be employed to explore aspects of the optimization space applicable to a matrix superstructure for a particular application. In some embodiments, such computer software may employ techniques and algorithms based on as machine learning, artificial intelligence, deep learning, or other implements of data science.

In some embodiments, such computer software is configured to effectuate the additive manufacture of matrix superstructures designed therewith, and may include the design and optimization constraints arising from certain additive manufacturing processes, associated materials, or the additive manufacturing tooling available to the user. Some embodiments of such computer software may comprise aspects of computer vision, machine vision, or processing of 3D data. Computer software may be embodied and deployed according to a plurality of architectures or models, such as, and without limitation, software-as-a-service (SaaS), platform-as-a-service (PaaS), cloud-based, premise-based, bare metal, virtualization, distributed architectures, mobile devices, embedded systems, etc.

SFLMs described herein may include the aforementioned annular plates, clamps, and matrix superstructures. Some embodiments may further comprise substrate plates. Annular plates, annular clamps, and/or matrix superstructures may be employed or incorporated in apparatuses comprising additional or complementary thermal or mechanical elements that may reinforce, enhance, provide redundancy, and/or provide additional engineering margins. For example, an embodiment comprising a matrix superstructure may further be encapsulated in a flexible or elastomeric material to provide additional mechanical support and environmental protection.

In another example, an embodiment comprising an annular clamp may further comprise other thermal management devices such as heat sinks, heat pipes, liquid cooling, or the like, and some annular clamps may or may not be thermally coupled to such thermal management devices. In another embodiment, an annular clamp may comprise a relatively thick top plate with fins or other features to increase surface area or reduce thermal resistance to the ambient and environment.

In some embodiments, an annular clamp comprises a polymer or composite top clamp plate and a metallic bottom clamp plate such the bottom clamp plate is configured to receive one or more pegs or other protrusions of the top clamp plate. These pegs or protrusions of the top plate pass through the FPC and the bottom plate. The thusly-assembled annular clamp is retained by heat staking of the one or more pegs or protrusions using a method of heat staking.

Figure 17A:
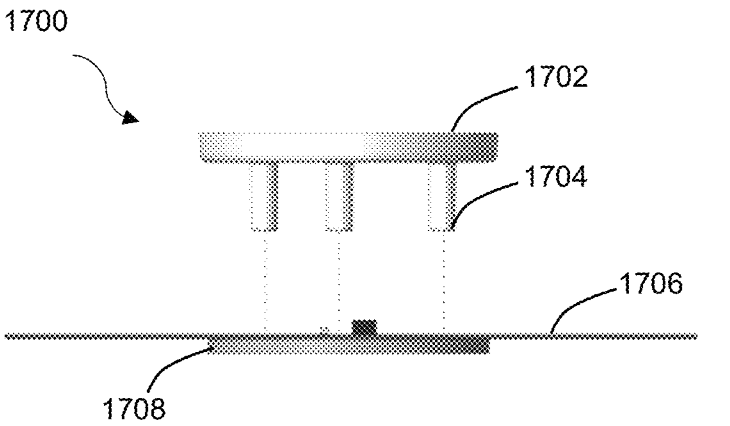
FIGS. 17A-17C a process for assembling an annular clamp assembly in accordance with one embodiment.
Figure 17B:
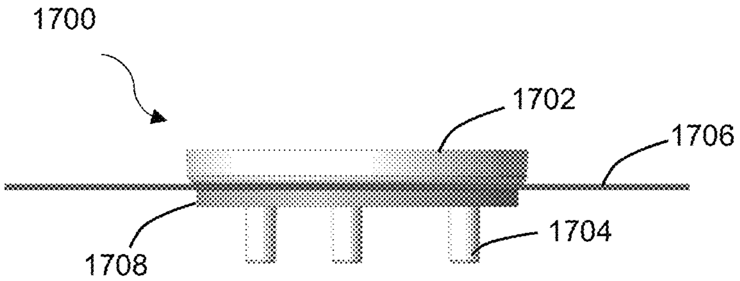
Figure 17C:
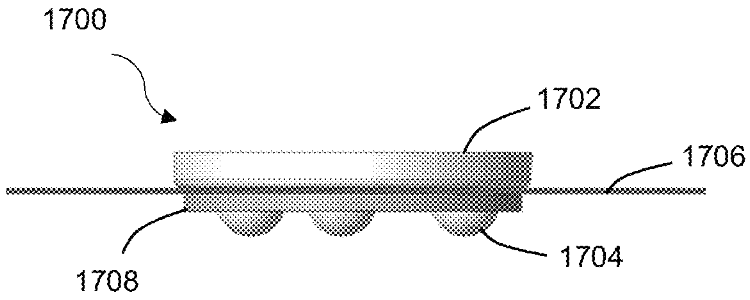

FIG. 17A illustrates an annular clamp assembly 1700 in which the polymer or composite top clamp plate 1702 is configured with one or more pegs or protrusions 1704. The protrusions 1704 pass through an FPC 1706 and bottom clamp plate 1708, as seen in FIG. 17B. FIG. 17C illustrates the annular clamp assembly 1700 after a heat staking procedure has melted the protrusions 1704 to retain the annular clamp assembly 1700. In some embodiments, heat staking of the protrusions 1704 may further serve to retain a matrix superstructure in relation to one or more of a bottom clamp plate or a bottom-side matrix superstructure.

The bottom clamp plate 1708 may be metallic and may be installed on the FPC 1706 by lamination, adhesive, solder, or by virtue of being part of the FPC or a rigid-flex circuit board and, in some such embodiments, such installation may occur as part of or during fabrication or assembly of the FPC circuit board or assembly 700. In some embodiments, other metallic or otherwise rigid components may be installed on the FPC, such as a reinforcing bar. In some embodiments, an installed bottom clamp plate 1708 may function to align the FPC with tooling or support the FPC during assembly, for example, to locate the assembly in a heat-staking press and provide mechanical support during heat-staking, which applies pressure perpendicular to the plate and the FPC. In some embodiments, tooling is designed to accept, interface with, or align with features of an FPC or an FPC with installed metallic or otherwise rigid components.

In some embodiments, an FPC may comprise an integrated board-edge or card-edge connector or connection feature. Alternatively, an FPC may be configured to receive a connector component during assembly. In some embodiments comprising an FPC with an integrated connection feature or connector, a rigid component may be installed on the FPC proximate to the connector and may provide one or more of support, strain relief, control of flexion, or mounting points. In some such embodiments, the rigid component may be installed on one or both of the top or bottom clamp plates of the FPC.

An FPC may be configured with one or more oversized holes, slots, elongated cut-outs, apertures (for simplicity, "slots"). A slot may be oblong, round, shaped like a tee or cross, or otherwise configured to prevent or reduce the effects of shear forces along one or more axes of the FPC. These slots may be configured to prevent or reduce shear forces between an FPC and any attached components, such as a matrix superstructure or fasteners. In these embodiments, the superstructure may be assembled to the FPC via features or fasteners through these slots.

An encapsulant may be installed within at least a portion of an inner diameter of an annular clamp or annular ring and surrounding a light emitter to reduce the apparent size of the light source or otherwise affect the quality or appearance of the light source. In some such embodiments, an encapsulant may comprise one or more of titanium dioxide ($TiO_2$) or mica.

An encapsulant may reduce thermal resistance or otherwise improve thermal performance of the device. In some embodiments, an encapsulant may provide environmental or mechanical protection for the one or more components located within the inner diameter of an annular clamp or annular ring, or may provide electrical insulation between an FPC and an annular clamp or annular ring.

Figure 18A:
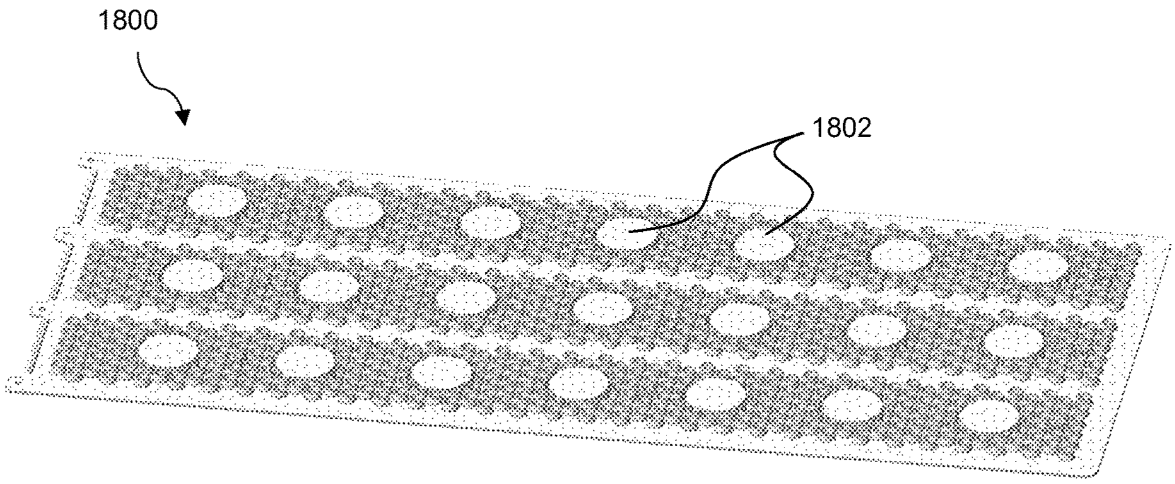
FIGS. 18A and 18B illustrate a matrix superstructure with optical elements in accordance with one embodiment.
Figure 18B:
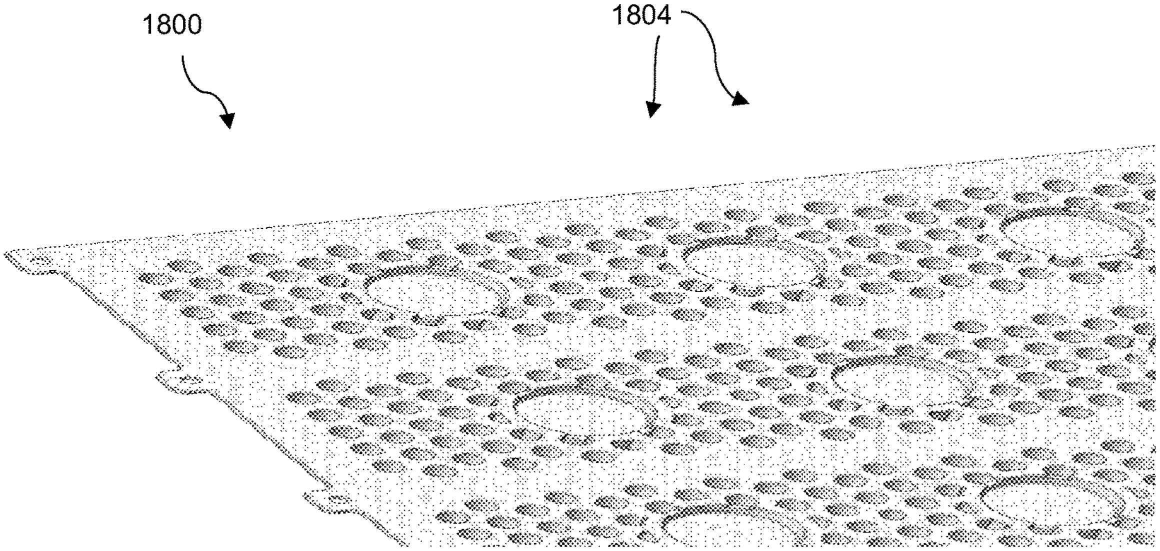

A matrix superstructure may also include one or more optical elements or lenses. FIGS. 18A and 18B illustrate top and bottom surfaces, respectively, of a matrix superstructure 1800 in accordance with one embodiment. The top surface of the matrix superstructure 1800 in FIG. 18A includes a plurality of optical elements or lenses (for simplicity, "optical elements 1802"). The bottom surface of the matrix superstructure 1800 in FIG. 18B may include a plurality of vents 1804 that may be integrated in the matrix superstructure 1800. These vents 1804 may enable one or more of air convection, cooling, egress of water, fluids, or other contaminants. In some embodiments, a vent 1804 may create a passage into a matrix element to create a path from one side of the vent to the outside environment.

A matrix superstructure may be configured with one or more tabs along one or more edges. These tabs may interface with one or more features of an assembly that connects to the panel edge. In some embodiments, the interfacing of such tabs with an external component, device, or assembly effectuates the alignment of the panel with respect to the assembly to fix the location of one end/edge of the matrix superstructure.

Some embodiments of a flexible lighting panel may be configured with one or more loops or other features enabling the attachment of a panel using rope, webbing, or other similar means ("loops"). A loop may comprise fabric, webbing, or another compliant material. In some embodiments, a loop may comprise a rigid metallic, composite, polymer, or other material.

A loop may be configured to remain in fixed alignment with a planar axis of a panel or may be configured to rotate or swivel in a plane approximately parallel to the surface of a panel. In some embodiments, a loop may be configured to act as a webbing buckle.

An SFLM may also be configured with a backing comprising a fabric or similar flexible material to which, in some embodiments, may be attached one or more sections of webbing, rope, cord, or a similar material ("webbing"). Webbing may interface with one or more mounting points to retain a panel, e.g., to the roof or side of a tent or shelter. In some embodiments, such webbing may be designed to be compatible with a mounting system such as the Modular Lightweight Load-carrying Equipment ("MOLLE") system or functionally-similar system. Webbing may include one or more buckles or similar devices to enable self-retention or general attachment capabilities. In some embodiments, fabric backing and/or webbing may be configured to include sections of hook-and-loop fasteners or another two-part fastening material. In some embodiments, webbing or portions of webbing may be retained to the panel by hook-and-loop fasteners or another two-part fastening material. Connections or couplings between a panel, webbing, and external components may include two-part fastening materials, such as hook-and-loop, buckles, tie-down points, snaps, buttons, zippers, magnetic couplings, or other present or future systems of similar function.

A lighting panel may be configured with user controls and/or annunciators in operable connectivity with a panel control circuit. In some embodiments, a panel may be configured with one or more modular or other connectors to enable the connection of the panel to power or communications wiring. In some embodiments, modular or other connectors may provide retention mechanism(s), may comprise keying or other features to ensure correct orientation and alignment, may comprise gaskets, o-rings, glands, seals, or equivalent to resist intrusion of moisture or contaminants, or may comprise stain reliefs.

A panel controller may communicate with another panel controller or another control system. In some embodiments, communications and power may share the same conductor(s). In some embodiments, one or more controllers may be configured such that actuation of a user control on one panel or actuation of a non-panel user control may change the state of one or more panels. A panel may be configured such that an annunciator indicates whether the panel is under local or remote control. In some embodiments, user controls may allow the user to alter the state of one or more of lighting intensity/brightness, color, on/off state, local/remote mode, user control backlight or annunciator brightness, or other configuration parameters.

Panel controllers or other controllers may monitor the total current draw or power utilization of one or more panels and, in some embodiments, prevent exceeding a specified current or power limit and, in some embodiments, this power limit may be temperature-compensated or temperature-dependent. For example, the brightness/intensity of one or more panels may be decreased automatically such that user may increase the intensity of another panel without exceeding a current or power limit. Some embodiments may be configured with a low-power mode wherein a current or power limit is set artificially low to constrain power consumption. Low-power mode may enable extended useful lighting under battery power in some embodiments. Some embodiments may comprise provisions for operation below their normal/nominal operating voltage and such provisions may include boost converters, disabling one or more light emitters to reduce the requisite operating voltage, or switching to lower-voltage light emitters, such as red LEDs, which typically have lower forward voltages than white LEDs.

The lighting panels or controllers may be configured to detect and respond to panel faults, such as short circuits or failed lighting elements. In some embodiments, a panel or panel controller may respond to a detected fault by decoupling its lighting or other circuitry from its power input and allowing power to bypass the panel to other downstream panels or other devices. In some embodiments, this fault detection and response mechanism may prevent a faulty panel from causing failure or degraded performance of a multi-panel system. The FPC of a panel may be configured with redundant electrical power paths such that, at least over the majority of the area of the panel, the panel will continue to fully function even in the event of a single puncture in the FPC.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. An apparatus comprising:

a first clamp plate having:

an inner diameter defining an aperture, a first outer diameter, and a first thickness;

a second clamp plate having:

a second outer diameter, and a second thickness, wherein the second clamp plate and the first clamp plate are configured to clamp a printed circuit board by penetrating the printed circuit board, the printed circuit board including at least one component positioned within the aperture during clamping of the printed circuit board by the first clamp plate and the second clamp plate, wherein the first clamp plate is a low-thermal-resistance annular plate configured to mechanically connect with the second clamp plate.

2. The apparatus of claim 1, wherein the printed circuit board is a flexible printed circuit.

3. The apparatus of claim 1 wherein the second clamp plate includes at least one feature that extends through the printed circuit board and mechanically attaches to the first clamp plate.

4. The apparatus of claim 3 wherein the second clamp plate extends beyond a top surface of the first clamp plate and a mechanical connection between the first clamp plate and the second clamp plate is effectuated by bending, peining, pressing, soldering, welding, brazing, or heat staking of the feature of the second clamp plate.

5. The apparatus of claim 1 wherein the first clamp plate and the second clamp plate are each configured to accept a fastener that passes through at least a portion of the first clamp plate, the printed circuit board, and at least a portion of the second clamp plate.

6. The apparatus of claim 1 wherein a thermal paste or compound is installed at an interface between the printed circuit board and at least one of the first clamp plate or the second clamp plate.

7. The apparatus of claim 1 wherein one or both of the first clamp plate and the second clamp plate comprises a non-plastic polymer or plastic.

8. The apparatus of claim 1 wherein the second clamp plate includes a relief or cut-out providing clearance for a substrate plate.

9. The apparatus of claim 1 wherein a substrate plate is installed on a bottom side of the printed circuit board under the at least one component.

10. The apparatus of claim 9 wherein the substrate plate is integrated into the second clamp plate.

11. The apparatus of claim 1 wherein the first clamp plate is formed from a rigid material.

12. An apparatus comprising:

a first annular clamp plate including:

an inner diameter, an outer diameter, a thickness;

a printed circuit board in operable connectivity with the first annular clamp plate including one or more copper layers and one or more substrate layers;

at least one component configured to be installed on the printed circuit board at a position such that the inner diameter subtends the at least one component; and a substrate plate installed on a side of the printed circuit board opposite the component.

13. The apparatus of claim 12 wherein the first annular clamp plate is configured to reduce thermal resistance between or among the at least one component, the at least one printed circuit board, and the ambient environment.

14. The apparatus of claim 12 wherein the first annular clamp plate is configured to provide mechanical support for the at least one component.

15. The apparatus of claim 12 wherein the first annular clamp plate is configured to provide mechanical support for a point of attachment between the at least one component and the printed circuit board.

16. The apparatus of claim 12 wherein the printed circuit board is a flexible printed circuit board.

17. The apparatus of claim 12 wherein the thickness of the first annular clamp plate is greater than or equal to a height of the component on the printed circuit board.

18. The apparatus of claim 12 wherein the first annular clamp plate is attached to the printed circuit board at least in part by means of solder, an adhesive, or a thermally-conductive adhesive.

* * * * *